(12) United States Patent
Threlkel et al.

(10) Patent No.: US 9,507,195 B2
(45) Date of Patent: Nov. 29, 2016

(54) INTEGRATED BUILDING DISPLAY AND SHADING SYSTEM

(71) Applicants: Travis Threlkel, San Francisco, CA (US); Niklas Lundback, San Francisco, CA (US)

(72) Inventors: Travis Threlkel, San Francisco, CA (US); Niklas Lundback, San Francisco, CA (US)

(73) Assignee: Obscura Digital, San Francisco, CA (US)

( * ) Notice: Subject to any disclaimer, the term of this patent is extended or adjusted under 35 U.S.C. 154(b) by 3 days.

(21) Appl. No.: 13/769,137

(22) Filed: Feb. 15, 2013

(65) Prior Publication Data

US 2014/0055433 A1    Feb. 27, 2014

Related U.S. Application Data

(62) Division of application No. 12/846,722, filed on Jul. 29, 2010, now abandoned.

(51) Int. Cl.
| | |
|---|---|
| G02F 1/1333 | (2006.01) |
| G09F 19/22 | (2006.01) |
| G09F 19/16 | (2006.01) |
| E06B 9/24 | (2006.01) |
| G09F 9/33 | (2006.01) |
| G09F 9/35 | (2006.01) |
| G09F 9/37 | (2006.01) |
| G09F 19/18 | (2006.01) |
| G09F 9/302 | (2006.01) |
| G02F 1/1334 | (2006.01) |
| G02F 1/1335 | (2006.01) |
| G02F 1/15 | (2006.01) |
| G02F 1/17 | (2006.01) |

(52) U.S. Cl.
CPC ............ *G02F 1/13336* (2013.01); *E06B 9/24* (2013.01); *G09F 9/3026* (2013.01); *G09F 9/33* (2013.01); *G09F 9/35* (2013.01); *G09F 9/372* (2013.01); *G09F 19/16* (2013.01); *G09F 19/18* (2013.01); *G09F 19/22* (2013.01); *E06B 2009/2464* (2013.01); *G02F 1/1334* (2013.01); *G02F 1/133615* (2013.01); *G02F 1/15* (2013.01); *G02F 1/172* (2013.01); *G02F 2201/44* (2013.01)

(58) Field of Classification Search
CPC .. G09F 9/3026; G09F 19/16; G02F 1/13336; E06B 2009/2447; E06B 2009/2452; E06B 2009/2458; E06B 2009/2464
USPC ...................................................... 349/15, 73
See application file for complete search history.

(56) References Cited

U.S. PATENT DOCUMENTS

| | | | | |
|---|---|---|---|---|
| 4,158,274 | A * | 6/1979 | Saenz ........................ | 52/127.12 |
| 5,980,052 | A * | 11/1999 | Thor et al. ................. | 359/877 |
| 8,408,199 | B1 * | 4/2013 | Klinkman ................... | 126/621 |
| 2003/0071259 | A1* | 4/2003 | Yoshida ..................... | 257/40 |
| 2008/0002161 | A1* | 1/2008 | Streid et al. ............... | 353/98 |

* cited by examiner

*Primary Examiner* — Dennis Y Kim

(74) *Attorney, Agent, or Firm* — Law Offices of John Stattler, PC

(57) ABSTRACT

An integrated building display and shading system formed of a plurality of exterior building panels arranged in an array, each exterior building panel representing one pixel. A given pixel resides in a first state when a first excitation state is applied to the exterior building panel and can be changed to reside in a second state when a second excitation state is applied to the exterior building panel, thus allowing an image to be presented on the array. The excitation states are controlled by an electronic control system including a frame buffer and an illumination source. Different types of variable property glass can be used such that a first state is a transparent state and the second state is an opaque state or color state (e.g. red, green, blue). The integrated building display and shading system can be illuminated via natural light, or via UV light, or via a projector.

14 Claims, 25 Drawing Sheets

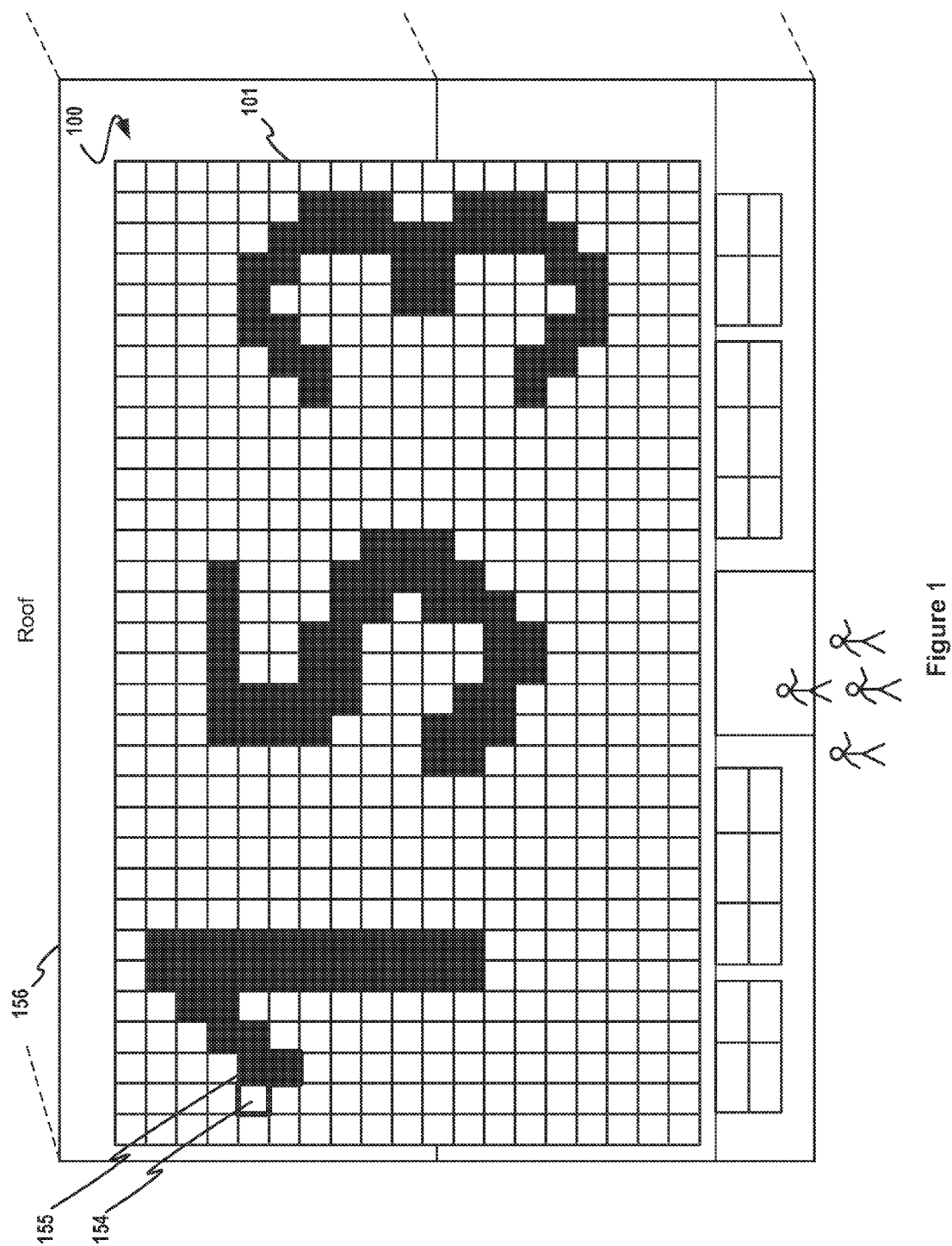

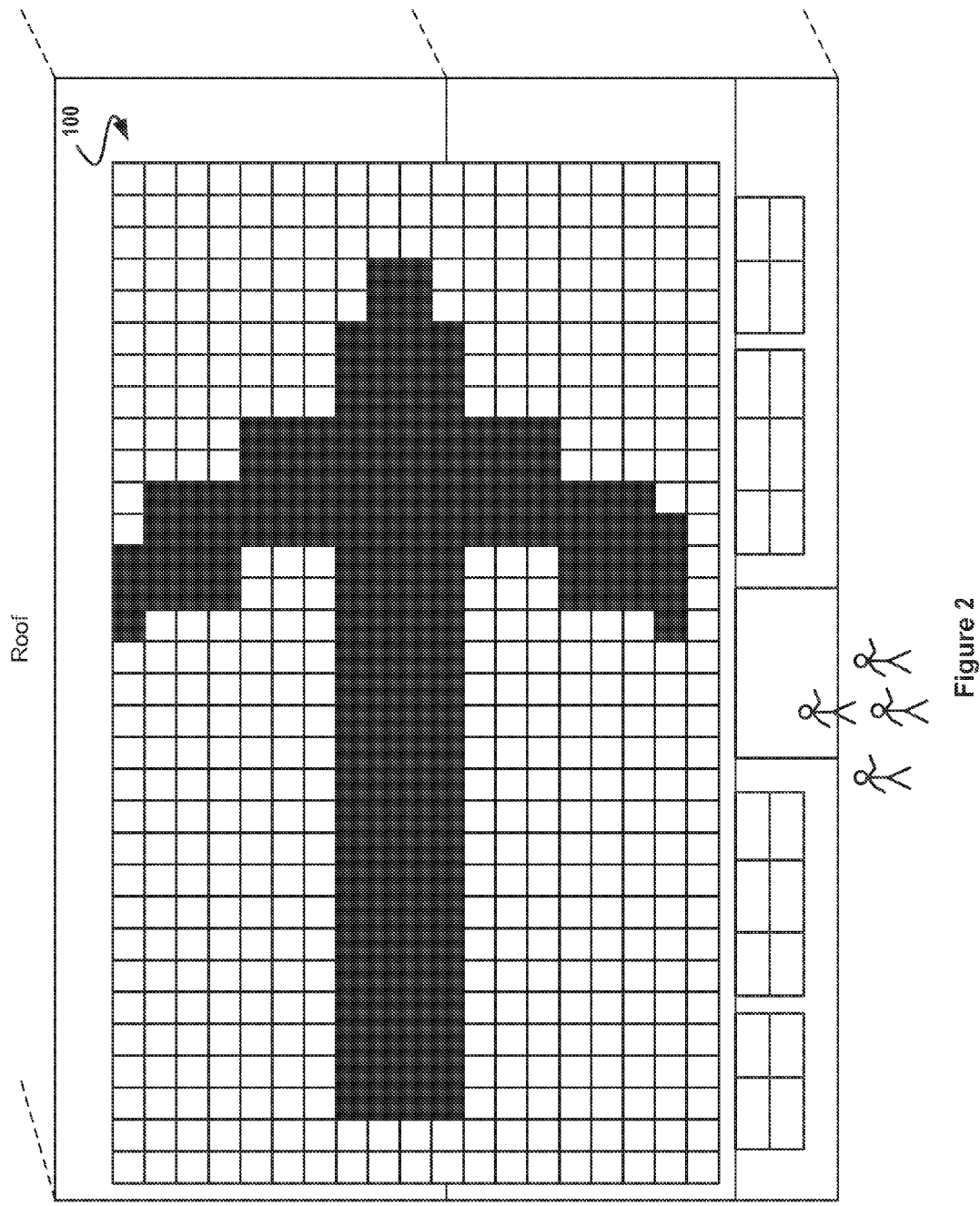

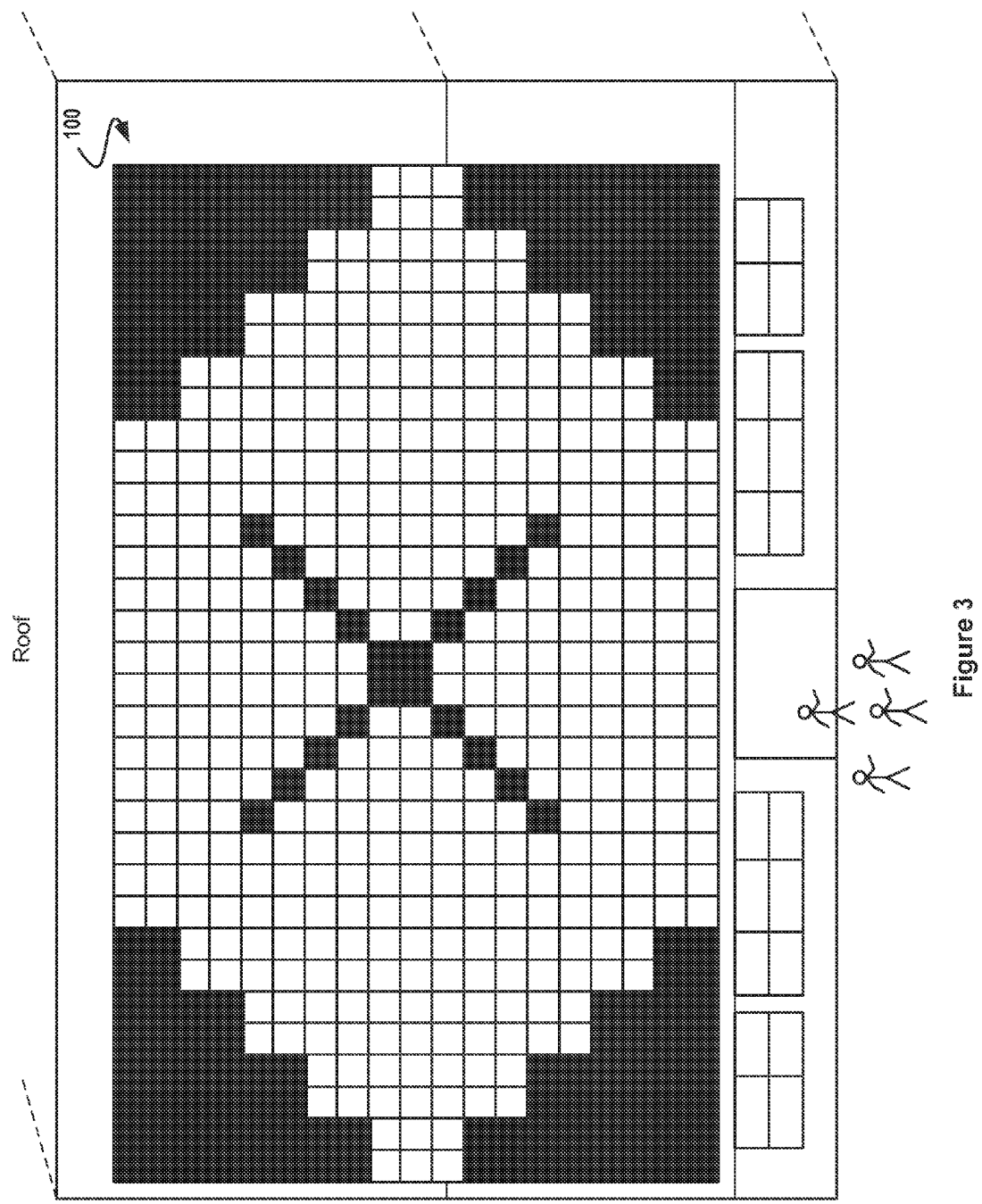

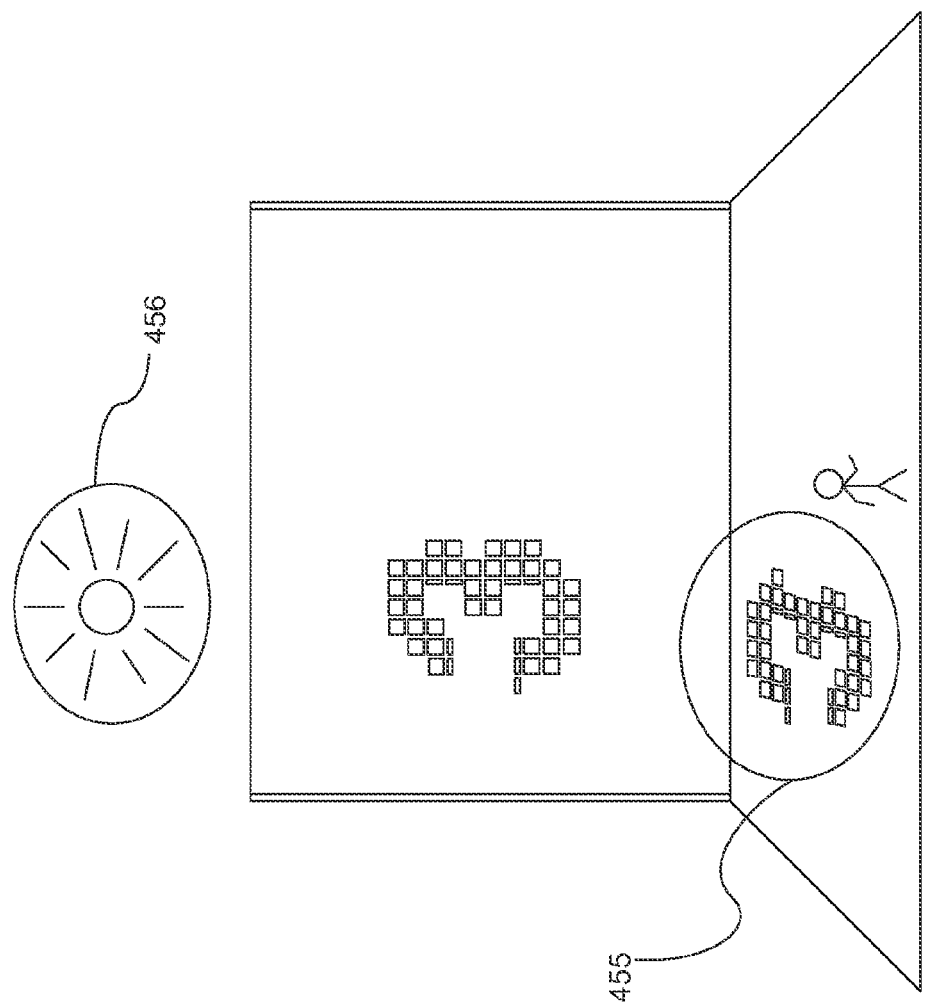

INTEGRATED BUILDING DISPLAY AND SHADING SYSTEM

RELATED APPLICATIONS

This application claims priority, under 35 U.S.C. §119(e), to U.S. Provisional Application No. 61/230,644, filed Jul. 31, 2009 and is a divisional of and claims priority, under 35 U.S.C. §121, to U.S. patent application Ser. No. 12/846,722, filed Jul. 29, 2010, both of which are expressly incorporated herein by reference.

TECHNICAL FIELD

The technical field of embodiments of the present invention pertains to display and shading systems. More specifically, the technical field relates to an integrated electrically controlled building display and shading system.

BACKGROUND

In many modern high rise office buildings, large panels of glass have been used to form the entire exterior walls of the buildings, thus reducing the construction time of building the exterior walls and windows. The glass panels can be fastened together by the exterior frame of the building, thus forming glass grid walls surrounding the entire building. Another way of forming the glass grid wall is to "hang" each glass panel to the exterior frame (or wall) of a building behind the glass panel without physically attaching the glass panels to each other. This results in small gaps between the adjacent edges of any two glass panels.

One of the disadvantages of such glass walls is that they may cause discomfort to pedestrians on the streets or drivers driving their cars on the streets as they sometimes reflect light (e.g. sun light). Another disadvantage is that the transparent nature of the glass may not provide sufficient privacy to the occupants within such buildings. If the occupants use their own shades, blinds, screens, or curtains, then the building may present an unpleasant and untidy image to the pedestrians and on-lookers.

One prior solution to solve this problem is to apply a layer of coating to the glass such that the transparency of the glass is altered (e.g. one way transparent or opaque or semi opaque both ways). However, this prior solution results in the transparency of the glass being permanently altered. When, for example, it is desired to have the original transparency of the glass during a particular time of a day, such thing is not possible unless the layer of coating is removed.

Thus, it would be desirable if such glass walls can be utilized to provide benefit to people walking on the streets while still being able to offer privacy and energy savings to the occupants in the buildings behind the glass walls.

BRIEF DESCRIPTION OF THE DRAWINGS

The features and advantages of embodiments are illustrated by way of example and are not intended to limit the scope of the claims to the particular embodiments shown.

FIG. 1 shows an integrated building display and shading system in accordance with several embodiments.

FIG. 2 shows an integrated building display and shading system in accordance with several embodiments.

FIG. 3 shows an integrated building display and shading system in accordance with several embodiments.

FIG. 4 shows shadow images projected on a building floor by the building display and shading system of FIGS. 1-3 in accordance with one embodiment.

DETAILED DESCRIPTION

Figure 5A:
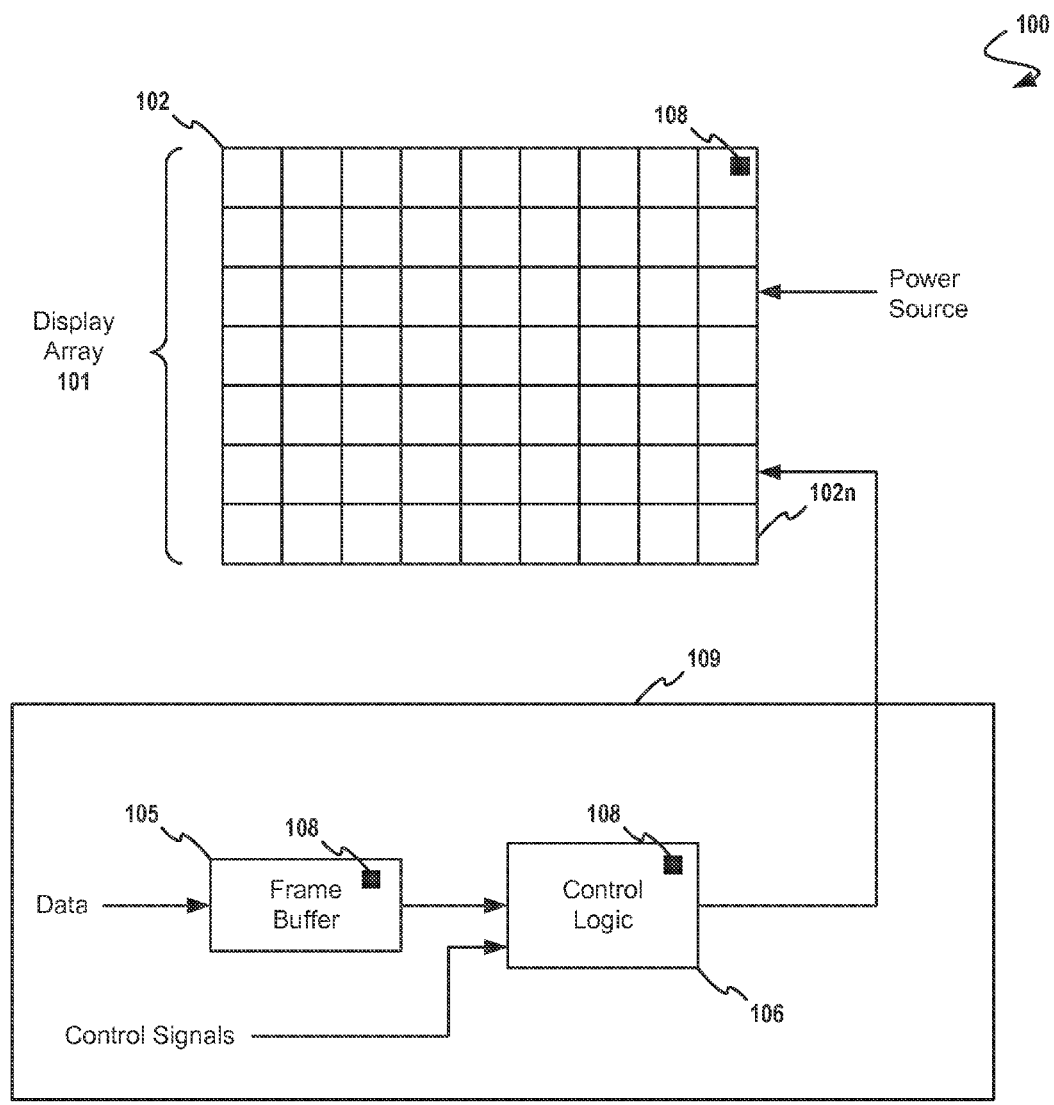
FIG. 5A is a functional block diagram of the integrated building display and shading system of FIGS. 1-4, wherein the building display and shading system includes a display and shading array formed by a number of exterior smart glass panels of a building, each representing a display pixel of the display array, according to some embodiments.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application-related and business-related constraints, and that these specific goals will vary from one implementation to another and from one developer to another. However, will be understood that such a development effort might be complex and time-consuming, but would nevertheless be a routine undertaking of engineering for those of ordinary skills in the art having the benefit of embodiment(s) of this disclosure.

Various embodiments illustrated in the drawings may not be drawn to scale. Rather, the dimensions of the various features may be expanded or reduced for clarity. In addition, some of the drawings may be simplified for clarity.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles (or any combination thereof).

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of tangible storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The term "glass" as used herein refers to a layer that can be formed into a shape having a planar or near-planar surface. The term "glass" encompasses such layers composited from conventional window glass, or layers formed of silicates, or layers formed of plastics or acrylics, or film, or any other material capable of residing in a transparent or translucent state. In some embodiments, the term "glass" refers to a compound layer comprised itself of multiple layers.

The terms "smart glass", "switchable glass", "electrically switchable glass", or "electrically controllable glass" (interchangeable hereinafter) refer to electrically switchable glass (or other transparent material like plastics) panels which change electromagnetic wave transmission properties (e.g. light transmission properties) when voltage is applied. Certain types of smart glass can allow users to control the amount of light and heat passing through, changing between transparent and opaque with a change in applied voltage. Some types of smart glass (e.g. privacy glass, privacy sheets) are used to provide privacy (e.g. when in an opaque state). Some types of smart glass can change from transparent to opaque white. Still, other types of smart glass can change from transparent to opaque black.

Smart glass technologies include electro-chromic devices, suspended particle devices, and liquid crystal devices. Electro-chromic devices may be controlled throughout a continuously varying range of change of transmission properties. For example, a continuously varying range of opacity, or a continuously varying range of transparency, or a continuously varying range of reflectivity, or a continuously varying range of electromagnetic wave absorbency, etc. Commonly electro-chromic devices involve applying a coating of special material to glass (or other type of transparent materials like plastics). In the case of the electro-chromic devices, a coating of electro-chromic material on the glass changes its opacity: it changes between a colored, translucent state (usually blue) and a transparent state. In some cases, a burst of electricity is required for changing its opacity, but once the change has been effectuated, no electricity is needed for maintaining the particular shade which has been reached. In some cases, darkening occurs from the edges, moving inward, and is a slow process, ranging from many seconds to several minutes depending on window size.

Figure 6:
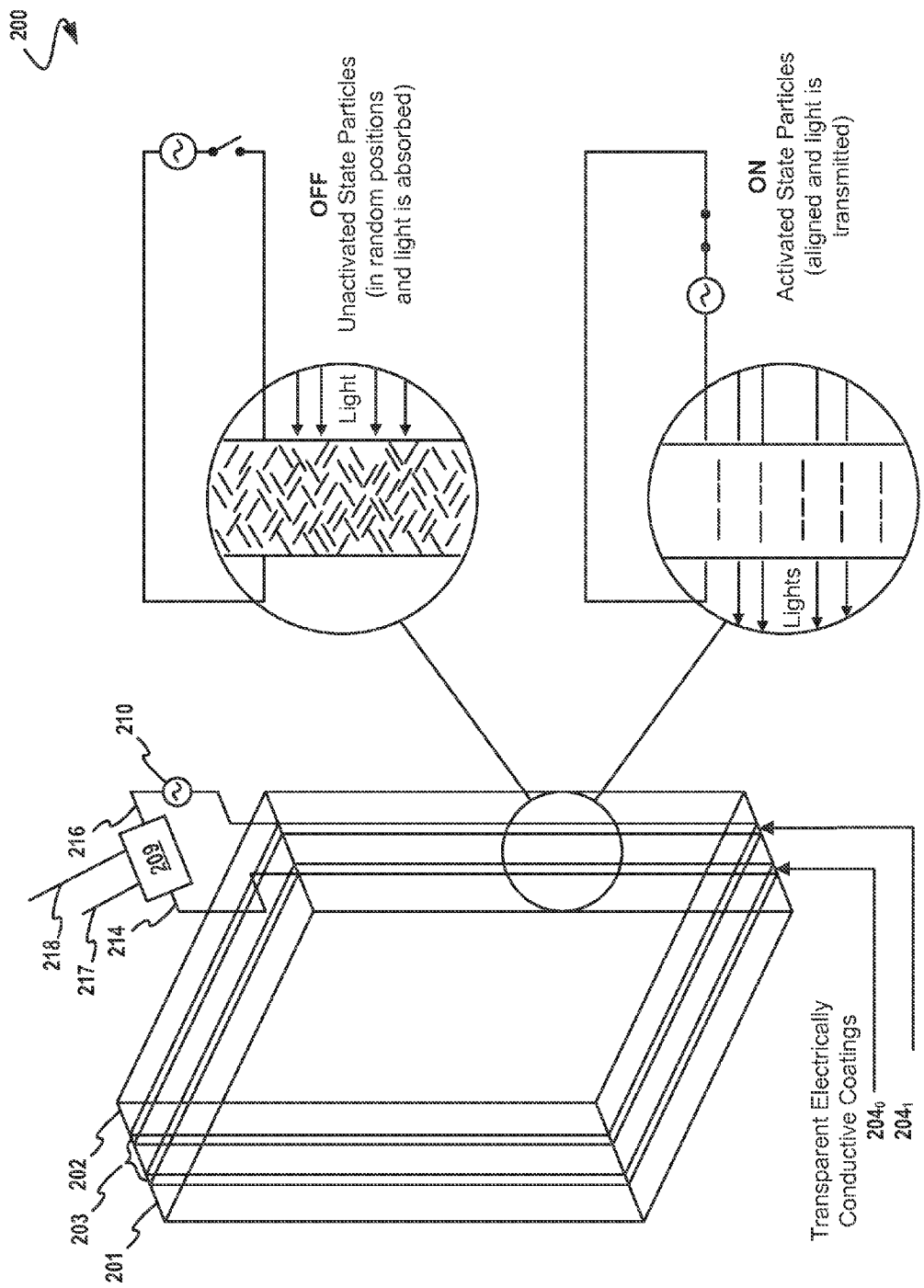
FIG. 6 shows the structure of the smart glass panel that forms each display pixel of the display array of FIG. 5A, according to some embodiments.

In the case of the suspended particle devices ("SPD") coating, the coating includes rod-like particles suspended in a fluid (see also FIG. 6). When no voltage is applied, the suspended particles are arranged in random orientations and tend to absorb light, so that the glass panel looks dark (or opaque), blue, white, grey or black. When a voltage is applied, the suspended particles align and let light pass.

Figure 7:
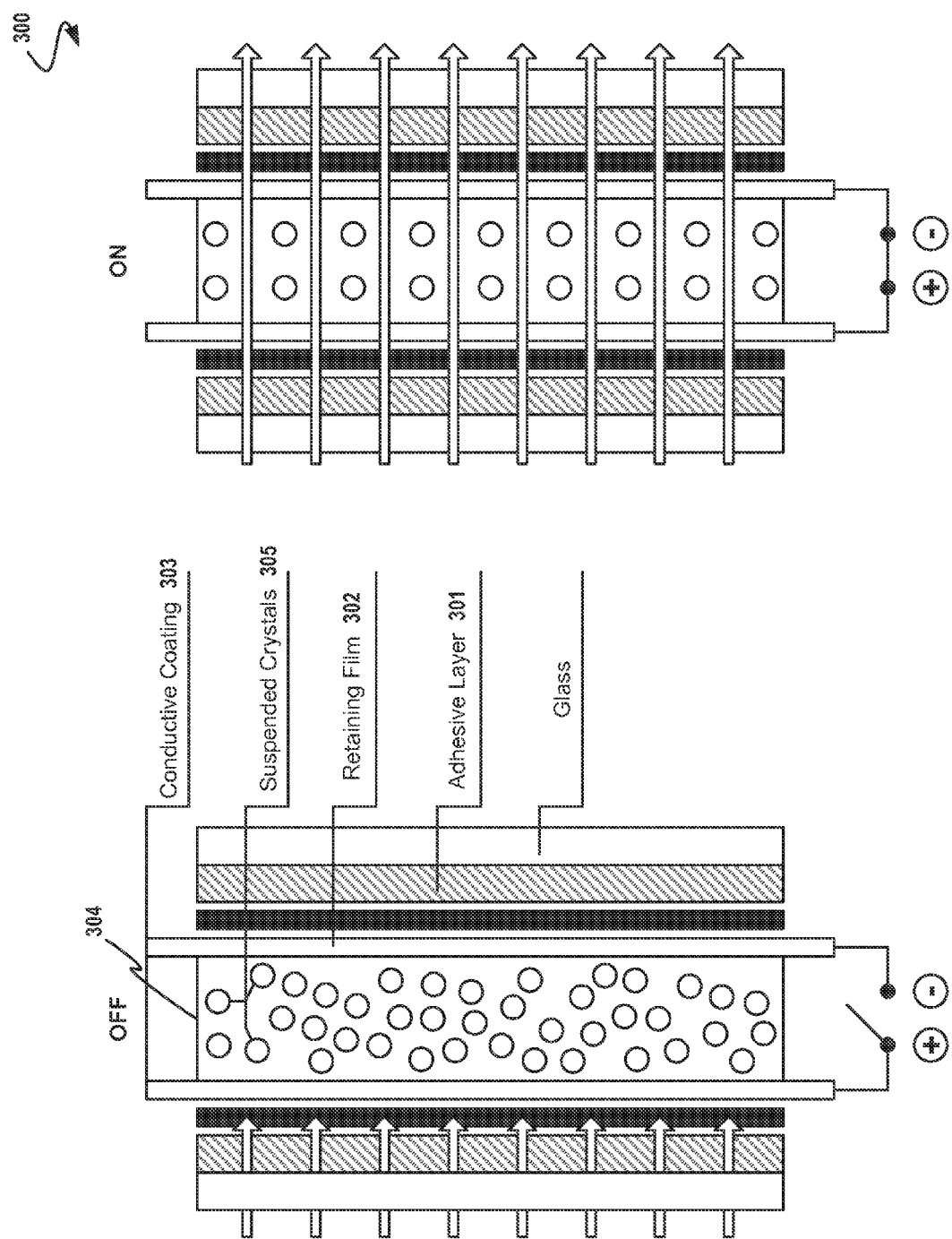
FIG. 7 shows the two states (transparent and opaque) of each smart glass panel of FIGS. 5A-6, according to some embodiments.

In the case of the liquid crystal devices ("LCD") coating, liquid crystals are dissolved or dispersed into a liquid polymer followed by solidification or curing of the polymer (see FIG. 7). During the change of the polymer from a liquid to solid, the liquid crystals become incompatible with the solid polymer and form droplets throughout the solid polymer. The curing conditions affect the size of the droplets that in turn affect the final operating properties of the "smart glass". Typically, the liquid mix of polymer and liquid crystals is placed between two layers of glass or plastics that include a thin layer of a transparent, conductive material followed by curing of the polymer, thereby forming the basic sandwich structure of the smart glass. This structure is in effect a capacitor. Electrodes from a power supply are attached to the transparent electrodes. With no applied voltage, the liquid crystals are randomly arranged in the droplets, resulting in scattering of light as it passes through the smart window assembly. This results in the translucent "milky white" appearance. When a voltage is applied to the electrodes, the electric field formed between the two transparent electrodes on the glass cause the liquid crystals to align, thereby allowing light to pass through the droplets with very little scattering, resulting in a transparent state. The degree of transparency can be controlled by the applied voltage. This is possible because at lower voltages, only a few of the liquid crystals are able to be aligned completely in the electric field, so only a small portion of the light passes through while most of the light is scattered. As the voltage is increased, fewer liquid crystals remain out of alignment thus resulting in less light being scattered.

The smart glass technologies and photo-chromic glass technologies employed in some embodiments include the SPD and LCD technologies, as well as technologies for producing photo-chromic glass. This means that either a SPD coating or a LCD coating is used to make the smart glass panel. Additionally, various embodiments combine smart glass with photo-chromic glass.

As will be described in more detail below and in connection with FIGS. 1-12, an integrated building display and shading system 100 includes an array of a plurality of exterior building panels (e.g. panels 102 through 102n in FIG. 5A) of a building that are also functioning as display pixels. In one embodiment, each panel is a single smart glass panel. This means that the panel includes at least one sheet of glass (or other transparent material like plastics) and a layer of smart glass coating. In another embodiment, each exterior panel includes a grid of individually controlled smart glass grid elements arranged in an array (e.g. a rectangular array, a square array, a linear array), with each grid element functioning as a display pixel.

In one embodiment, each smart glass panel is made of two sheets of glass (or other transparent material) sandwiching a layer of smart glass coating. In another embodiment, the smart glass coating is applied to one sheet of glass (or other transparent material) to form the smart glass panel. In an alternative embodiment, each smart glass panel includes one or more grid frames to partition the smart glass coating into a number of grids, each being individually controlled.

In other embodiments, an integrated building display and shading system can comprise a first sheet of transparent material having a one or more grid frames defining a plurality of grid elements (e.g. square or rectangular, or other repeating shapes in a repeating pattern) disposed next to a second sheet of transparent material with a layer of suspended particles in a fluid is placed in each of the grids of the first sheet, wherein the first and second sheets sandwich the layer within each of the grid elements, thus forming an array of the grid elements. Using any of the aforementioned techniques for controlling the state (e.g. on, off, black, white, clear, grey, etc), the layer in the grid elements can be controlled (e.g. using a electrical voltage) to enter a first state and can further be controlled to switch to a second state (e.g. when there is no electrical voltage applied), thus allowing an image to be presented on the array.

Each pixel may be in a transparent state when electrical power is applied and in an opaque state presenting a color (white, or grey scale) when there is no electrical power is applied, thus allowing an image to be presented on the array. Grey scale values, between fully opaque ("off") and fully transparent ("on"), may be achieved by modulating the smart glass into a partial "on" state, wherein the grey scale value achieved depends how much the smart glass is turned "on". The more the smart glass is turned on, the lower the grey scale value is. Alternatively, each pixel may be in an opaque state when electrical power is applied and in a transparent state when no electric power is applied.

For some types of smart glass, modulation of the grey scale level is achieved by increasing or decreasing the applied voltage to adjust the percentage of light transmitted by the smart glass. In other embodiments, a grey scale value between "on" and "off" is achieved by rapidly (e.g. many times per second) switching the smart glass between the opaque and transparent states, so that higher grey scale values are produced as the smart glass spends more time in the opaque state.

The opaque state can also be a colored state. This can be achieved, for example, using a RGB LED (Red Green Blue Light Emitting Diode) color source. The color light generated by the RGB LEDs can then be presented via the smart glass coating.

FIGS. 1-4 show the implementation of such a system. As can be seen from FIGS. 1-4, each glass window panel is an electrically controlled or switchable smart glass panel between an "on" state and an "off" state. In one embodiment, each panel represents a display pixel and is switched "on" and "off". In another embodiment, each panel includes an array of displaying pixels, each capable of individually being turned on and off.

In one embodiment, the size of each pixel is six square inches. In another embodiment, the size of each pixel is one square foot. In a further embodiment, the size of each pixel is several feet by several feet. In alternative embodiments, the size of each pixel can be larger or smaller than the above sizes indicated.

FIG. 1 shows numbers being presented by the smart glass panels of the integrated building display and shading system 100. More particularly, FIG. 1 depicts an integrated building display and shading system 100 comprising a display array 101 of exterior building panels 154 for creating a visual display array, and for creating shade. As shown, each exterior building panel represents one pixel and can be in a first state (e.g. darkened, as shown in building panel 155) when a first electrical voltage is applied to the panel and can be in a second state (e.g. not darkened, as shown in building panel 154) when a second electrical voltage is applied to the panel, thus allowing an image to be presented on the array. Such a configuration serves a variety of display capabilities, as well as serving for controlling lighting/shading conditions of spaces interior to the building 156. Not shown in FIG. 1 (though possibly housed within general proximity of array 101) is an electronic control system including a frame buffer to control the switching between the first state (e.g. as shown in building panel 154) and the second state (e.g. as shown in building panel 155).

FIG. 2 shows a sign (an arrow sign) being presented by the smart glass panels of the integrated building display and shading system 100.

FIG. 3 shows other symbols being presented by the smart glass panels of the integrated building display and shading system 100.

FIG. 4 shows the application of projecting shadows of the images (e.g. symbol 455, as shown) presented by the smart glass panels of the integrated building display and shading system 100 using, for example, light incident on the outside of the integrated building display emanating from an external light source 456 (e.g. the sun, or a light source outside the building, etc). In this figure, the images are projected onto the floor inside the building on which integrated building display and shading system 100 is installed.

The integrated building display and shading system as shown in FIGS. 1-4 allows for display of images (still or animated) and display of information. It also allows for shadow projection of the images on the display array of the integrated display and shading system with, for example, sunlight (see FIG. 4). In this case, the shadow is projected into the interior of the building, and the location of the projected imagery moves in synchrony with the direction of the sunlight throughout the day (see FIG. 4). When all (or a selected portion) of the panels are in the "off" state, they prevent light coming into the building and provide privacy to occupants within the building. In addition, the entire glass wall (or any region of the glass wall) can function as a conventional projection screen at this time, with one or more computer controllable light projectors displaying imagery on the opaque glass wall surface. A portion of the panels can be selected to be in the "off" state, so as to prevent a selectable amount of light from coming into the building and provide a measure of privacy to occupants within the building. For example, if an outside-facing wall comprised of an array of panels were to be used as just described, the lower four fifths (for example) can be selected to be in the 'off' state, thus allowing light to come into (or out of) the building only through the upper one fifth.

FIG. 5A shows the functional block diagram of the integrated building display and shading system 100. As can be seen from FIG. 5A, the integrated building display and shading system 100 allows each pixel to be changed from opaque (e.g. white, black, grey scale, or color) to transparent via an electronic control system 109 that includes a frame buffer 105 and a control logic 106. The control logic 106 is connected to the display array 101, and controls the operation of the display array 101. As shown in FIG. 5A, the display array 101 includes a number of display pixels 102-102$n$. As described above, each of the display pixels 102-102$n$ can be a smart glass panel or one grid element on the smart glass panel.

Figure 5B:
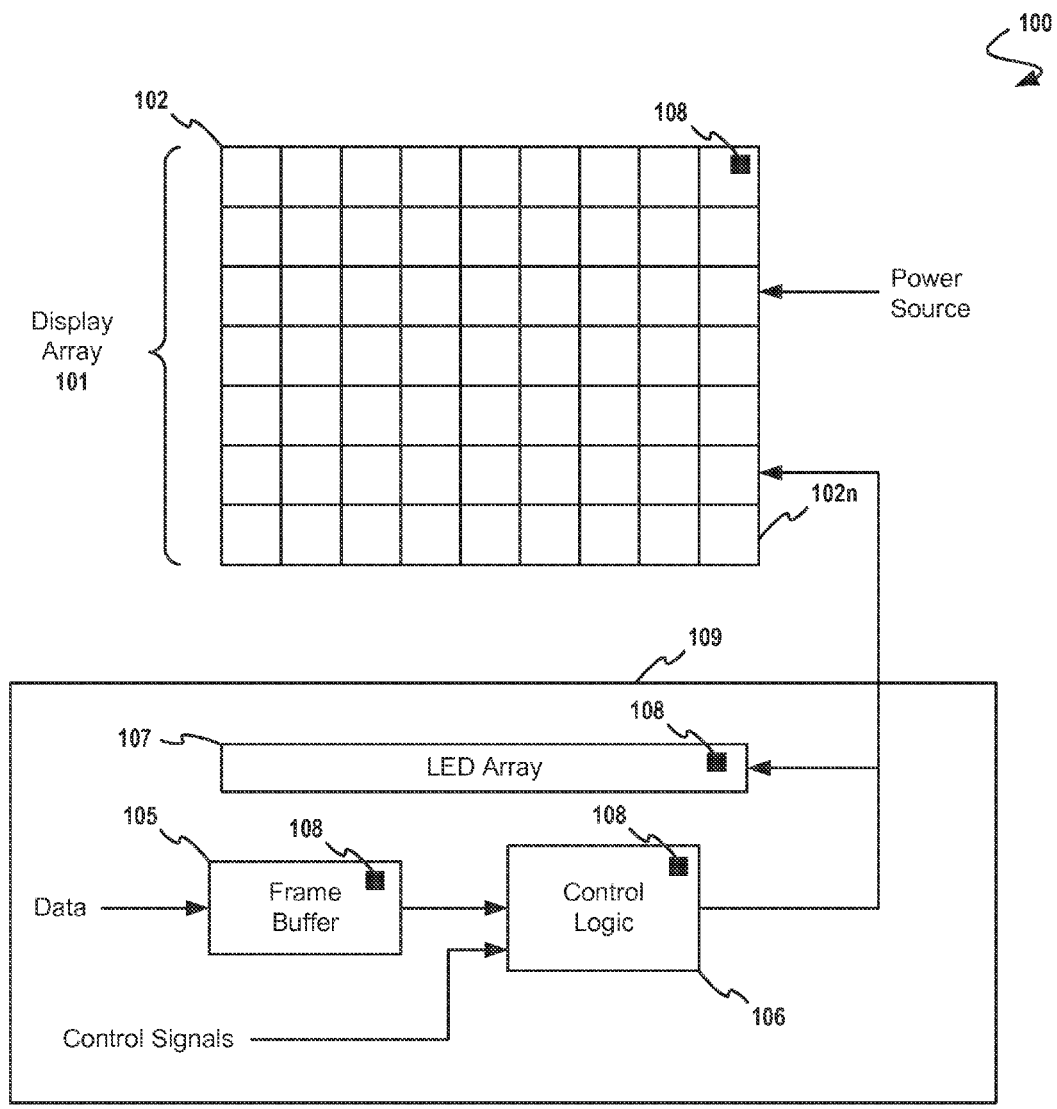
FIG. 5B is a functional block diagram of the integrated building display and shading system of FIGS. 1-4, wherein the building display and shading system includes a display and shading array formed by a number of exterior smart glass panels of a building, each representing a display pixel of the display array, according to some embodiments.

FIG. 5B shows the functional block diagram of the integrated building display and shading system 100. As can be seen from FIG. 5B, the integrated building display and shading system 100 allows each pixel to be changed from opaque (e.g. white, black, grey scale, or color) to transparent via an electronic control system 109 that includes a frame buffer 105 and a control logic 106. The control logic 106 is connected to the display array 101, and controls the operation of the display array 101. The integrated building display and shading system 100 also includes an LED array 107. In another embodiment, the LED array 107 can be replaced with other color light sources, or a UV light source. Alternatively, the integrated building display and shading system 100 does not include an LED array 107.

Figure 5C:
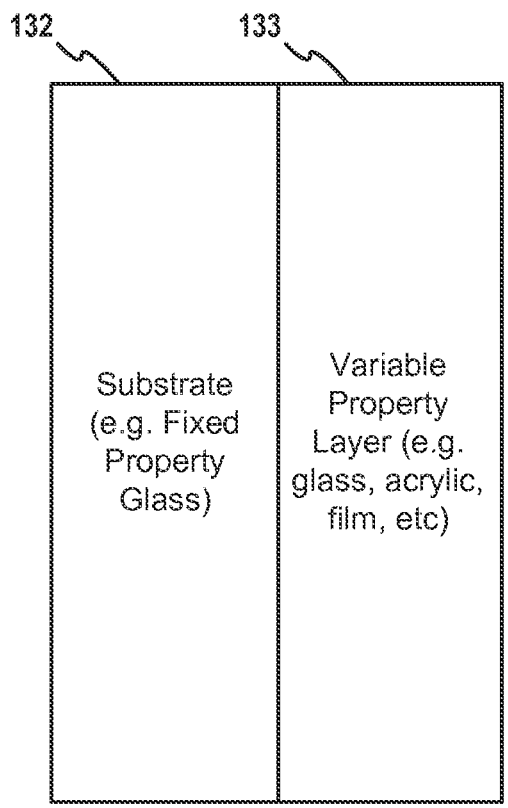
FIG. 5C depicts a generalized arrangement of multiple layers for forming a display array, according to some embodiments.

FIG. 5C depicts a generalized arrangement of multiple layers for forming a display array, according to some embodiments. A display array may be formed by arranging any one or more pixels. A pixel, in turn may be formed by combining a substrate 132 and a variable property layer 133. In some embodiments the variable property layer may be a sheet of film, or a sheet of smart glass, or a sheet of photo-chromic glass, or any other variable property layer. In various embodiments, a substrate may be comprised of any transparent, or translucent (or even opaque) layer, having sufficient mechanical properties to support the application or affixing of the variable property layer. Additional embodiments with additional layers and configurations are disclosed herein.

FIG. 6 shows the structure of a smart glass panel 200 that functions as a display pixel of the display array 101 of FIG. 5A. In FIG. 6, the smart glass panel 200 implements one embodiment. As can be seen from FIG. 6, the smart glass panel 200 includes a first sheet of glass 201 (or other transparent material like plastics) and a second sheet of glass 202 (or other transparent material like plastics). A layer of smart glass coating 203 is sandwiched between a first sheet of glass 201 and a second sheet of glass 202. In one embodiment, two transparent electrically conductive coatings (i.e. $204_0$ and $204_1$) are provided between the first sheet of glass 201 and the second sheet of glass 202. The electrically conductive coatings 204 allow electric power (i.e. from power source 210) in the form of electric voltage to be applied to the smart glass coating 203 such that an electric field is present in the space between the first sheet of glass 201 and the second sheet of glass 202, specifically by the effect of the electric field created by the difference of potential between a first electrical voltage 214 applied to electrically conductive coatings $204_0$ and a second electrical voltage 216 applied to electrically conductive coating $204_1$. The electric power applied is, for example, in the form of alternating current (AC). Alternatively, the electric power applied is in the form of direct current (DC).

FIG. 6 also shows the structure of the smart glass coating 203 when the smart glass coating 203 is turned "on" and "off". As described above, the smart glass coating 203 can be a SPD coating or a LCD coating. FIG. 6 shows the smart glass coating 203 made with the SPD coating. As can be seen from FIG. 6, when the power is not applied to the coating 203, the particles inside the coating are in random positions, thus blocking light from passing through. This makes the smart glass panel 200 opaque. When the power is applied to the coating 203, the particles inside the coating are aligned, thereby allowing light to pass through the smart glass panel 200 (i.e. the panel is transparent).

Still further, FIG. 6 shows electrically conductive leads, namely a plus polarity lead 217, and a minus polarity lead 218. Such electrically conductive leads can be used to communicate between any first device 209 (as shown) and any second device 209 (not shown). More particularly, the electrically conductive leads can be used to communicate between first device 209 and any second device 209 independent from a first voltage applied to electrically conductive coatings $204_0$ and a second electrical voltage 216 applied to electrically conductive coating $204_1$.

FIG. 7 illustrates operation of the smart glass coating when the smart glass coating is an LCD coating. As can be seen from FIG. 7, the smart glass assembly 300 includes a number of layers. They are two adhesive layers (e.g. 301), two retaining film layers (e.g. 302), and two transparent conductive coating layers (e.g. 303, 304, $404_0$, $404_1$), in addition to the smart glass coating 304. As can be seen from FIG. 7, the smart glass coating 304 is sandwiched by the additional layers. The smart glass coating 304 includes a number of suspended liquid crystals or droplets (e.g. 305), thus allowing the smart glass coating 304 to be turned "on" and "off". When power is not applied to the coating 304, the crystals inside the coating are in the random positions, thus blocking light from passing through. When power is applied to the coating 304, the crystals inside the coating are aligned, thereby allowing light to pass through the smart glass coating 304.

Figure 8A:
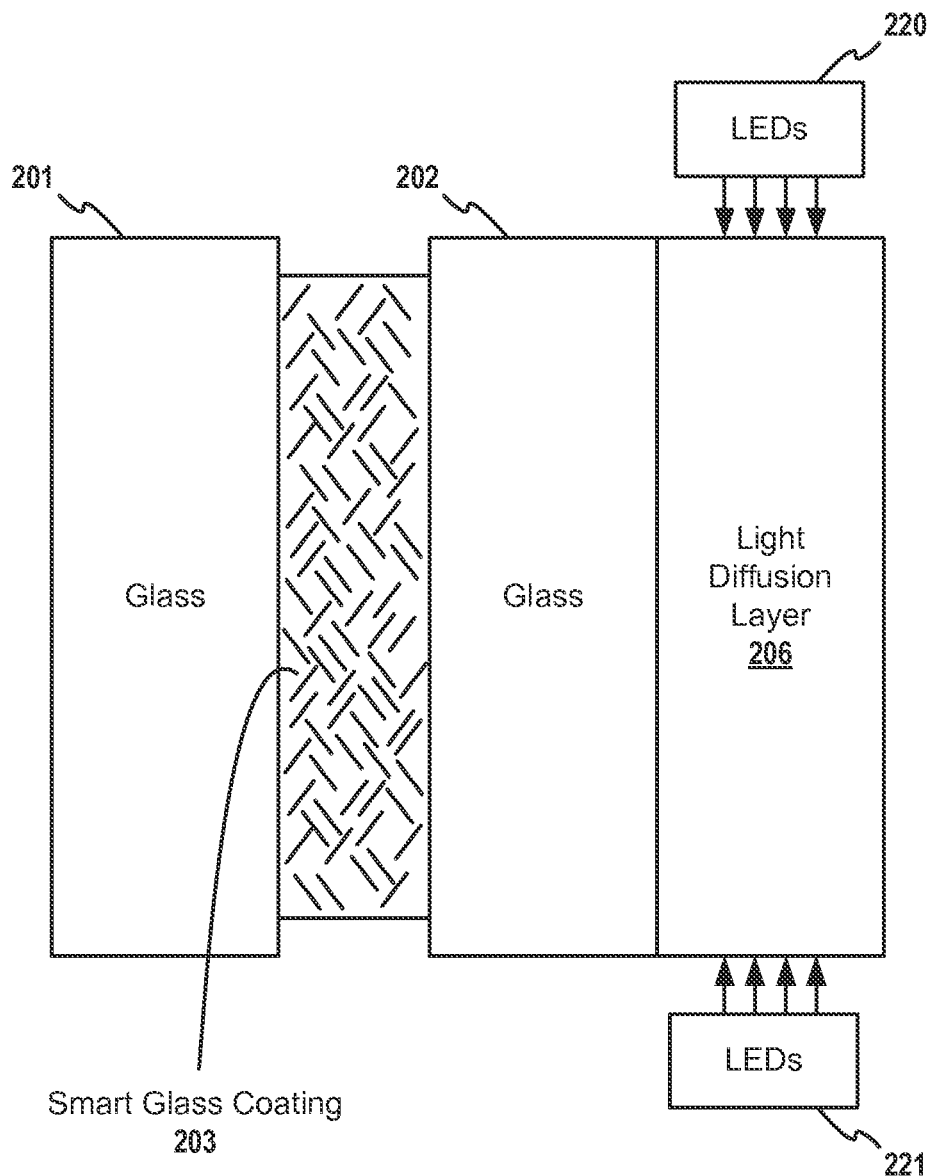
FIG. 8A shows a top view of the display panel of FIG. 6 with the RGB LED light source illuminating the smart glass coating, thus providing colored display, according to some embodiments.

FIG. 8A shows the arrangement of the LED array 107 of FIG. 5B in connection with the display array 101. FIG. 8A is a top view of the smart glass panel 200 of FIG. 6. As can be seen from FIG. 8A, LEDs 220-221 are placed on the side of the smart glass panel 200. LEDs 220-221 may be placed on just one side of the panel, on all sides, or on a subset of sides. To light up the smart glass panel 200 with LEDs, the LEDs aim into the side of at least one of the glass (or plastic) layers of smart glass panel 200. In some embodiments, the smart glass panel also includes a light diffusion layer 206, and the LEDs are aimed into one or more sides of this light diffusion layer 206. The light diffusion layer 206 may be located on either side of the sandwich of glass sheets and coating that compose the electronically switchable smart glass panel 200. The sheet may act as "backlight" to enhance the perceived color of the smart glass panel 200 when it is in an opaque state. In some of these embodiments, the light diffusion layer 206 is a sheet of Acrylite Endlighten, which is a transparent sheet of acrylic with embedded microscopic diffuser particles that cause light entering the sides of the sheet (but not the front or back) to be evenly diffused throughout it. Light entering the front or back of the sheet is transmitted with little loss. The smart glass panel 200 composed of both the smart glass and Endlighten sheets may be made transparent by switching the smart glass "off" (transparent) and turning the LEDs off. To instead produce a color on the smart glass panel 200, the smart glass component is turned "on" (opaque) and at least some of the LEDs shining into the diffusion layer are activated.

As described above regarding FIG. 5B, the end-lighting LEDs 220 and end-lighting LEDs 221 (e.g. RGB LEDS, UV LEDs) may be in strips that extend along the border (all the way around, or just a subset of sides) of the smart glass coating 203. The strips can be individual color strips (e.g. a red strip, green strip, and blue strip) or a RGB combination strips in which a single strip contains red, green, and blue LEDs. The RGB LED light source can also be placed on top of the coating. To control the color produced by the RGB LEDs, voltage levels may be separately applied to the set of red LEDs, the set of green LEDs, and the set of blue LEDs. The same voltage is applied to all LEDs within a given color set (e.g. red, green, or blue) on a single smart glass panel 200, but the voltages for the three different sets do not need to be equal. For example, to produce a blue color panel, zero voltage is applied to the red and green LEDs, and full voltage to the blue LEDs. To produce a yellow colored panel, full voltage is applied to the red and green LED sets, while zero voltage is applied to the blue LED set. To produce a shade of grey, the same voltage is applied to all three sets of LEDs, with higher voltages producing lighter shades of grey.

Alternatively, the system 100 does not require the RGB LED array 107. In that case, the color can be obtained from the smart glass coating. This can be achieved by having colored molecules or particles embedded in the SPDs or LCD themselves.

Referring again to FIG. 5B, the frame buffer 105 is connected to the control logic 106. The frame buffer 105 receives image data of each frame (i.e. frame data) to be displayed on the display array 101 from an external source (e.g. a computer system, a DVD player, etc). This can be done by having a computer system generate graphical output data to be applied to the frame buffer 105. The generated graphics can be, for example, video, interactive content, text, or still photography. As the frame buffer 105 gets updated at a desired time interval, an animation may be created. More specifically, a frame buffer 105 may be comprised of any number of bits per pixel, the bit representing controllable properties of the smart glass. For example, some number of bits in the frame buffer may be allocated to store a luminance value (e.g. brightness, as may be controlled by a voltage), and/or some number of bits in the frame buffer may be allocated to store a tint value. Such tint bits may be organized into one or more fields to represent relative mixtures of color, such as red, green, blue, or cyan, magenta, yellow, black or other color mixing scheme.

The frame buffer 105 stores the frame data and feeds that data to the control logic 106 to convert it into corresponding driver or control signals to drive each pixel. The frame buffer 105 can be implemented using any known means (e.g. RAM, EEPROM memory, registers, hard disk) and will be described in more detail, below.

The frame data in the frame buffer 105 are divided into rows or columns. Each row or column gets converted into a serial string that represents the pixel values for the entire row or column. Example data for a five pixel row can be as follows: (on/off,r,g,b); (on/off,r,g,b); (on/off,r,g,b); (on/off,r,g,b); (on/off,r,g,b), where "on/off" is a Boolean variable that indicates whether the smart glass panel is transparent or not, and where "r", "g", and "b" are numerical values indicating the relative brightness levels that should be produced by red, green, and blue illumination within each panel. The frame buffer 105 can also be converted to a signaling system that can communicate with the display array 101. As each pixel (i.e. independently controllable smart glass panel) in display array 101 receives its information, it changes its state. If the signaling system is a serial communication system, the serial communication system may send a different serial string of row or column data to each row or column of pixels. The first pixel in each row or column that receives the information also sends the string through to its neighboring pixel. Each pixel reads the incoming string, and may optionally modify it, before sending the optionally modified string to its neighboring pixel. Many string formats and corresponding means of reading and modifying strings may be used to implement an efficient communication. In one example, each pixel is programmed in its own hardware to know its location or id value within a row, searches the serial string for this location or id, and reads the "on/off", "r", "g", and "b" data associated with this location or id. In this example, the unmodified string is passed to the neighbor. In other embodiments, each pixel can automatically determine which part of the serial string to use without location or id information. In some of these embodiments, each pixel strips off and uses the first portion, (e.g. "on/off, r, g, b") of the serial string and only sends on the remainder to its neighbor. In other of these embodiments, the serial string contains a counter that indicates which part of the serial string should be used by the current pixel. When the string arrives at a pixel, it (1) picks out the data values at the position in the string indicated by the counter, (2) increases the counter, and (3) forwards the string to the neighboring pixel.

The control logic 106 receives control signals from external source (not shown in FIG. 5B) and the frame data from the frame buffer 105. The external source that generates the control signals can be a computer system running a software program to control the integrated building display and shading system 100.

The control signals the control logic 106 receives include, for example, a ground voltage, a source voltage, and control data inputs. Depending on the instructions received, the control logic 106 turns on or off the smart glass and changes the value of the voltages applied to LEDs. The control logic 106 does this by generating the native driver signals based on the control signals and the frame data to control the display array 101 to display images. In addition, the control logic 106 also generates the native driver signals to the LED array 107 based on the frame data from the frame buffer 105 and the control signals. The color capability provided by the integrated building display and shading system 100 offer exciting night time possibilities for lighting the display array 101 with various color looks as well as projecting video onto grouped clusters of white mode pixels. This system 100 can easily be tied to live RSS feeds and various data streams. A full array of interactive options can also be integrated with this technology.

Figure 11:
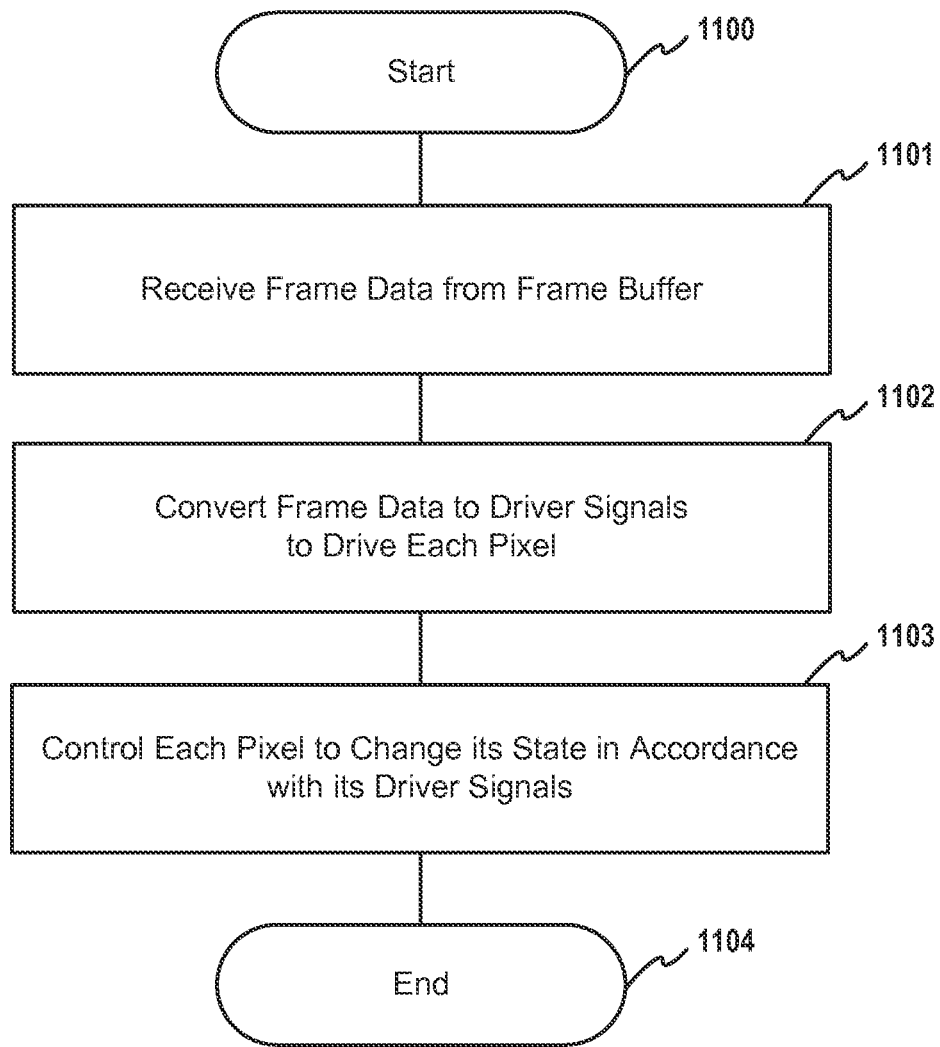
FIG. 11 is a flowchart diagram of the control process of the control logic of FIG. 5A, according to some embodiments.

The control logic 106 can be implemented in hardware, firmware, or a combination of hardware and software. In one embodiment, the control logic 106 is an embedded computer system with software running on the computer system. In another embodiment, the control logic 106 is an ASIC (Application Specific Integrated Circuit). The operational procedure of the control logic 106 is shown in FIG. 11, which will be described in more detail below.

Figure 8B:
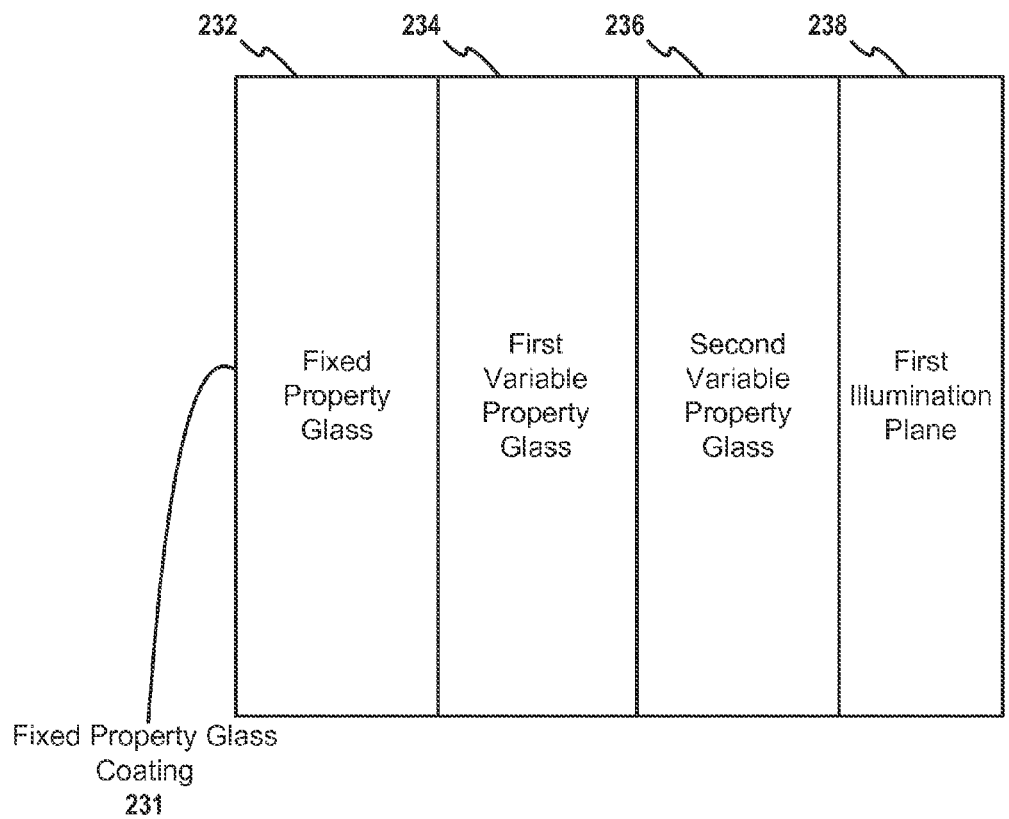
FIG. 8B depicts a generalized arrangement of multiple layers for forming a display array, according to some embodiments.

FIG. 8B depicts a generalized arrangement of multiple layers for forming a display array. As shown, the arrangement includes a layer comprising a first variable property glass 234 (e.g. smart glass, photo-chromic glass) disposed next to a layer comprising a second variable property glass 236 (e.g. smart glass, photo-chromic glass). Also shown are a first illumination plane 238 and a layer of fixed property glass 232. Not shown in FIG. 8B are electrically conductive coatings 204, and LEDs (e.g. RGB LED array 107, LEDs 220), either or both of which might be present in various embodiments. The layer of fixed property glass 232 can be coated with any one or more of a variety of coating designed for particular optical purposes (e.g. UV filtering, color filtering, polarization, diffusion, etc). Various embodiments as are discussed below are based on particular assembly combinations of the elements shown in FIG. 8B.

Figure 8C:
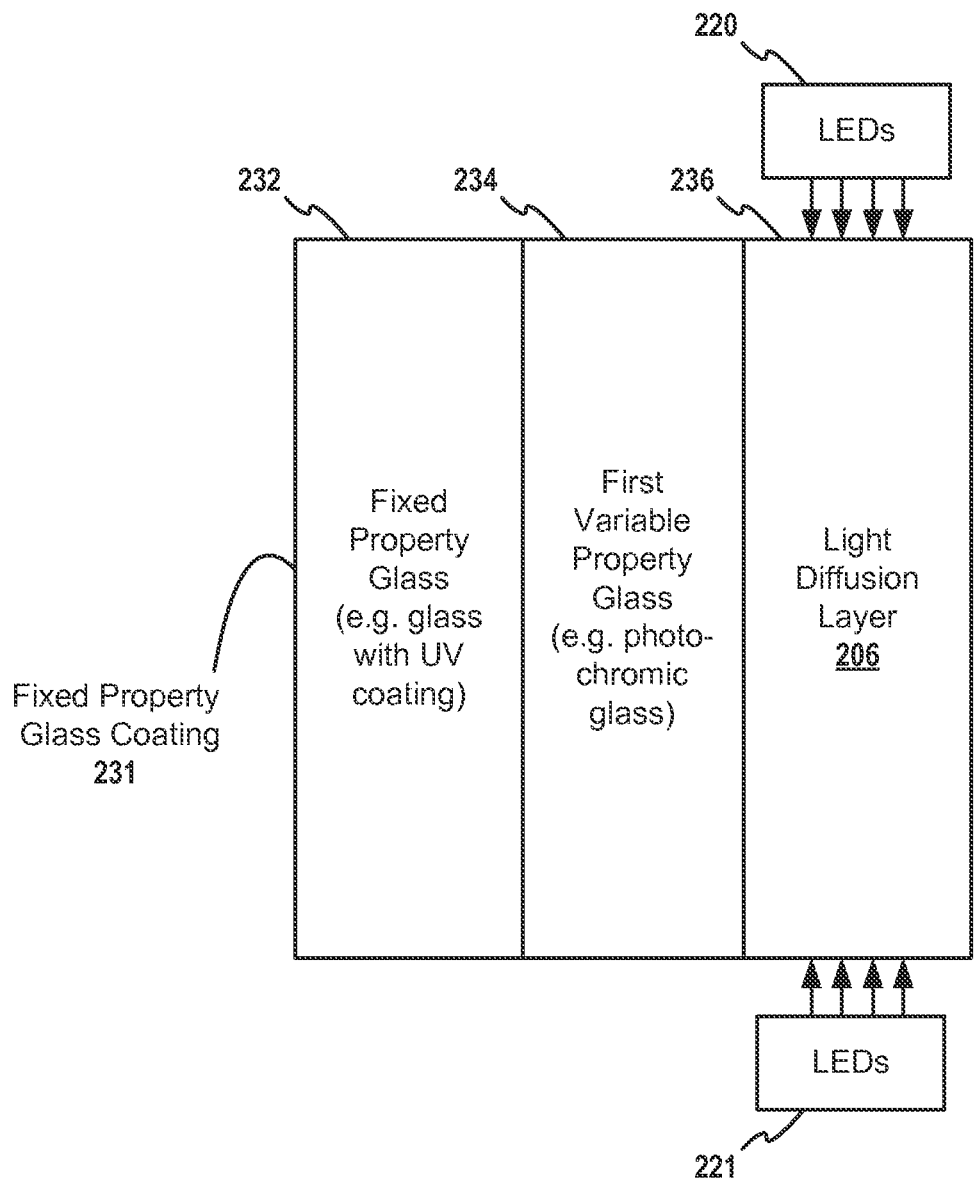
FIG. 8C depicts an assembly of multiple layers comprising a fixed property glass layer, a first variable property glass, and a light diffusion layer, according to some embodiments.

FIG. 8C depicts an assembly of multiple layers (as shown, three layers), comprising a layer of fixed property glass 232 (e.g. glass with a UV filter coating), a first variable property glass 234 (e.g. photo-chromic glass) and a light diffusion layer 206 (with end-lighting LEDs 220). In this embodiment, various photo-chromic glass is used, and the photo-chromic glass is responsive to the UV light from the LEDs. For example, a photo-chromic glass that transitions from clear to dark grey or black might be used to provide a privacy effect controlled by the LEDs. As those skilled in the art will readily recognize, this embodiment includes a layer of fixed property glass, having the property of filtering UV light. Of course such fixed property glass 232 can include a fixed property glass coating 231. Thus, such an assembly (specifically the layer of photo-chromic glass) can be controlled via signals (e.g. voltages) applied to the LEDs 220, and without interference or unwanted UV signals from the environment.

Figure 8D:
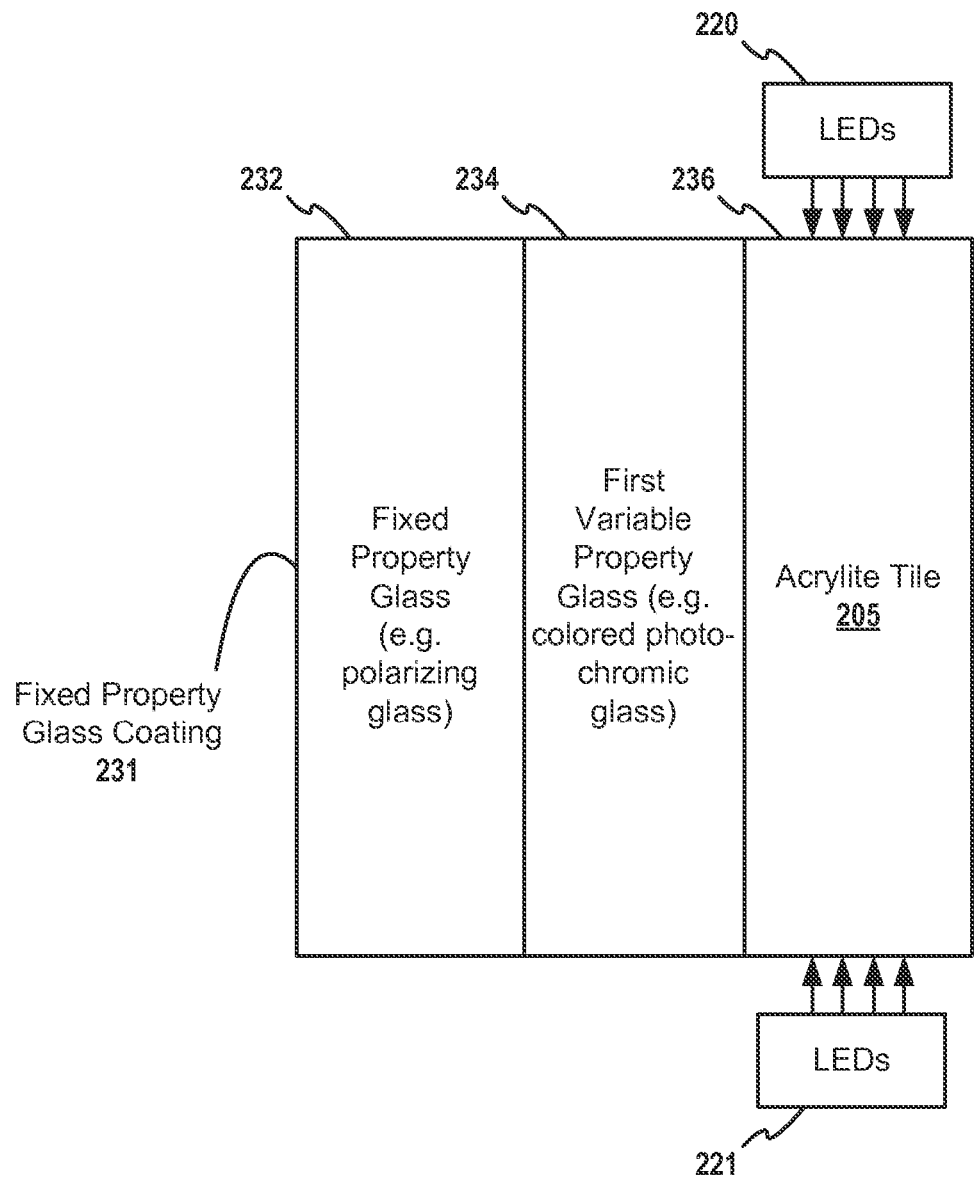
FIG. 8D depicts an assembly of multiple layers comprising a fixed property glass layer, a first variable property glass, a second variable property glass and a backlighting layer, according to some embodiments.

FIG. 8D depicts an assembly of multiple layers (as shown, three layers), comprising a layer of fixed property glass 232 (e.g. UV glass), a first variable property glass (e.g. colored photo-chromic glass), and a backlighting layer (e.g. using Acrylite tile 205 and end-lighting LEDs 220 and end-lighting LEDs 221). In this embodiment, colored photo-chromic glass is used, and the colored photo-chromic glass is responsive to the UV light from the LEDs. For example, a photo-chromic glass that transitions from clear to red might be used to provide a tinting effect controlled by the LEDs. Or, a second layer (not shown) of photo-chromic glass that transitions from clear to blue might be used to provide a tinting effect controlled by the LEDs, and combining the first (e.g. red) layer of photo-chromic glass with a second layer (e.g. blue) of photo-chromic glass, various effects involving the combination of red and blue might be produced. Of course a third layer or nth later (not shown) might be present to provide a third (or nth) tinting effect controlled by signals to the LEDs.

Figure 8E:
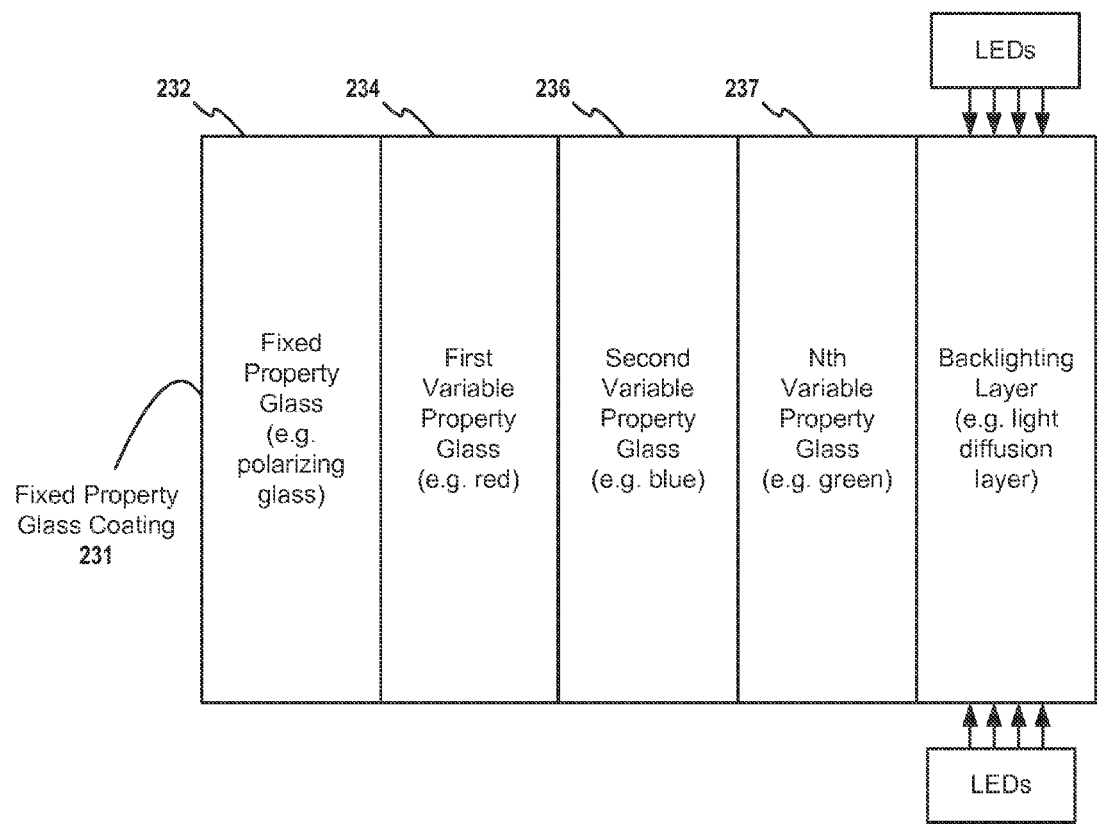
FIG. 8E depicts an assembly of multiple layers, comprising a fixed property glass layer, a first variable property glass, a second variable property glass, an Nth variable property glass, and a backlighting layer, according to some embodiments.

FIG. 8E depicts an assembly of multiple layers (as shown, five layers), comprising a fixed property glass layer, a first variable property glass, a second variable property glass, an Nth variable property glass 237, and a backlighting layer (e.g. a light diffusion layer). In this embodiment, various colored photo-chromic glass can be used, and the colored photo-chromic glass is responsive to the UV light from the LEDs. For example, a photo-chromic glass that transitions from clear to red might be used as the first variable property glass to provide a tinting effect controlled by the LEDs of the first acrylic tile layer. A second layer of colored photo-chromic glass that transitions from clear to blue might be used to provide a tinting effect. By combining the first (e.g. red) layer of photo-chromic glass with a second layer (e.g. blue) of photo-chromic glass, various effects involving the combination of red and blue might be produced. Of course a third layer (or nth later) might be present to provide a third (or nth) tinting effect. Also, additional acrylic tile layers may be provided to produce still more effects.

Figure 8F:
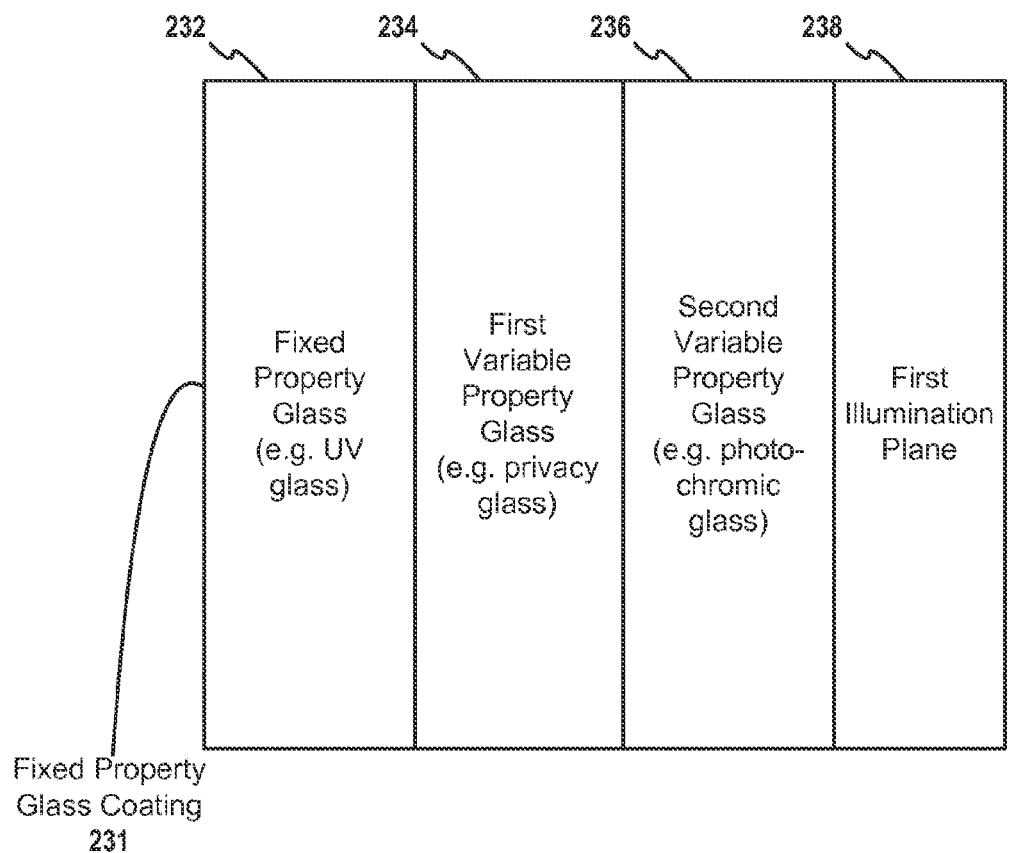
FIG. 8F depicts an assembly of multiple layers of glass, comprising a fixed property glass layer, a first variable property glass, and a second variable property glass, according to some embodiments.

FIG. 8F depicts an assembly of multiple layers of glass (as shown, three layers of glass), comprising a layer of fixed property glass 232 (e.g. UV glass), a first variable property glass (e.g. privacy glass), a second variable property glass (e.g. photo-chromic glass). Also shown is a first illumination plane 238 with an additional illumination plane (not shown) co-planar with the fixed property glass coating 231. In this embodiment, both privacy glass and photo-chromic glass is used. The privacy glass is activated by being responsive to the applied voltages, and the photo-chromic glass is activated by being responsive to light (esp. the UV light) incident on or through the first illumination plane.

TABLE 1

| Privacy Glass | Photo-chromic | Effect |
| --- | --- | --- |
| Off (clear) | In-active (clear) | Transparent clear |
| Off (clear) | Active (tinted) | Tinted clear |
| On (white) | In-active (clear) | Privacy with white inner wall |
| On (white) | Active (tinted) | Privacy with tinted inner wall |

Of course the privacy glass might transition from clear to black. Similarly, the photo-chromic glass might be tinted in any color.

Figure 8G:
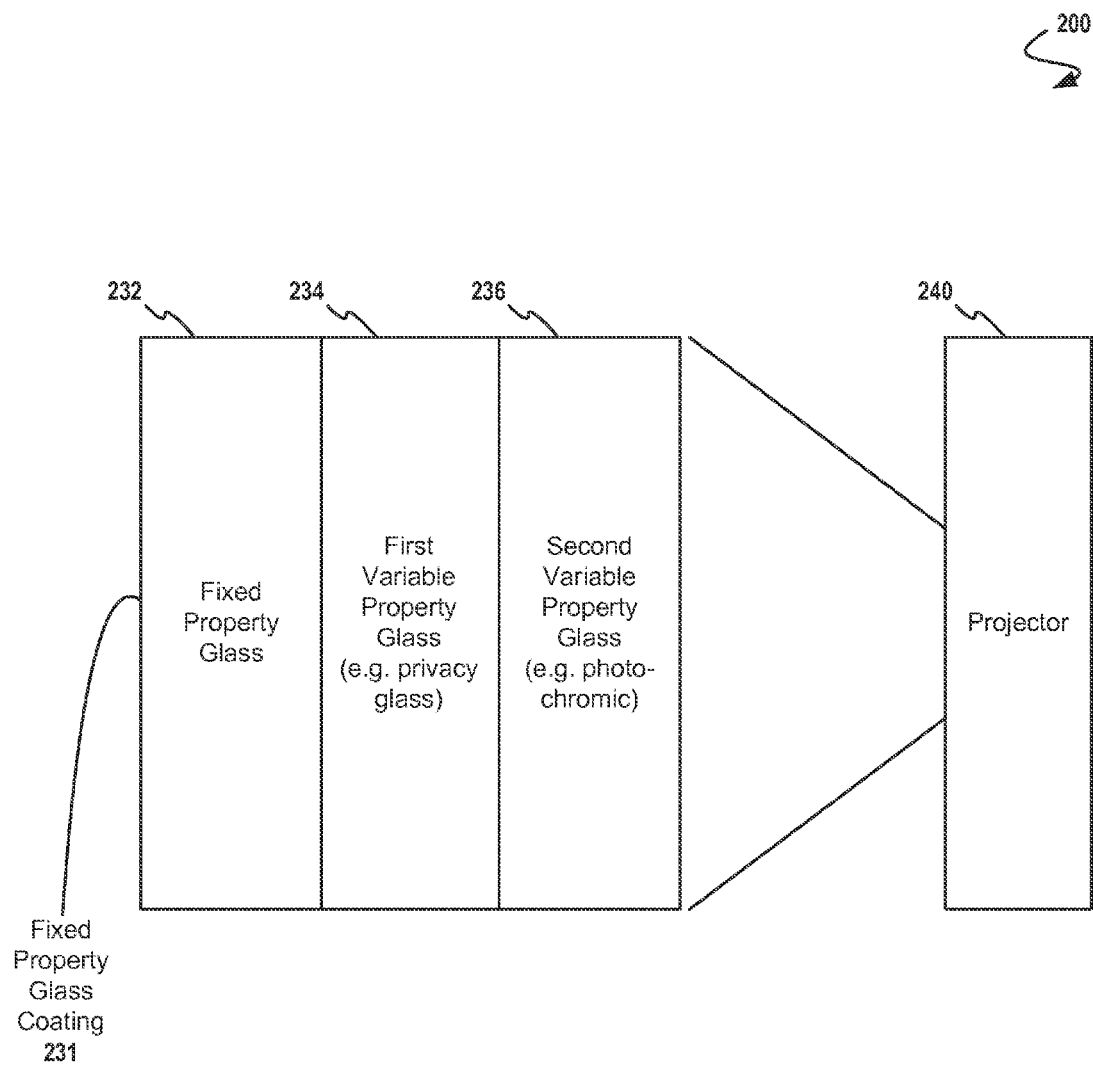
FIG. 8G depicts a projector, projecting on an assembly of multiple layers of glass comprising a fixed property glass layer, a layer of first variable property glass, and a layer of second variable property glass, according to some embodiments.

FIG. 8G depicts a projector, projecting onto an assembly of multiple layers of glass (as shown, three layers of glass), comprising a layer of fixed property glass 232 (e.g. UV glass), a layer of first variable property glass, and a layer of second variable property glass. The projector 240 might display any image using any combination of visible light and UV light. In fact, in one embodiment, the first variable property class can be white privacy glass (white and opaque), and the projected image is thus perceived by a human (viewing from the projector side) as if the projected image were projected on a projection screen. In other embodiments, the projector projects visible as well as UV wavelength light, and thus, can activate a layer of second variable property glass (e.g. photo-chromic glass) in order to produce a pattern across the entire plane of photo-chromic glass. Photo-chromic glass is activated by incidence of UV light on a region of photo-chromic glass, thus any shape (e.g. any projected shape) may activate a region of the photo-chromic glass. In other embodiments involving projection, multiple projectors may be used, possibly using multiple projectors in an array, whereby the light from a particular projector is incident on only a portion of the assembly. In still other embodiments involving projection, multiple projectors may be used, possibly using multiple projectors arranged in space, and not necessarily within a plane, and whereby the projectors use different focal lengths and/or light sources.

Figure 8H:
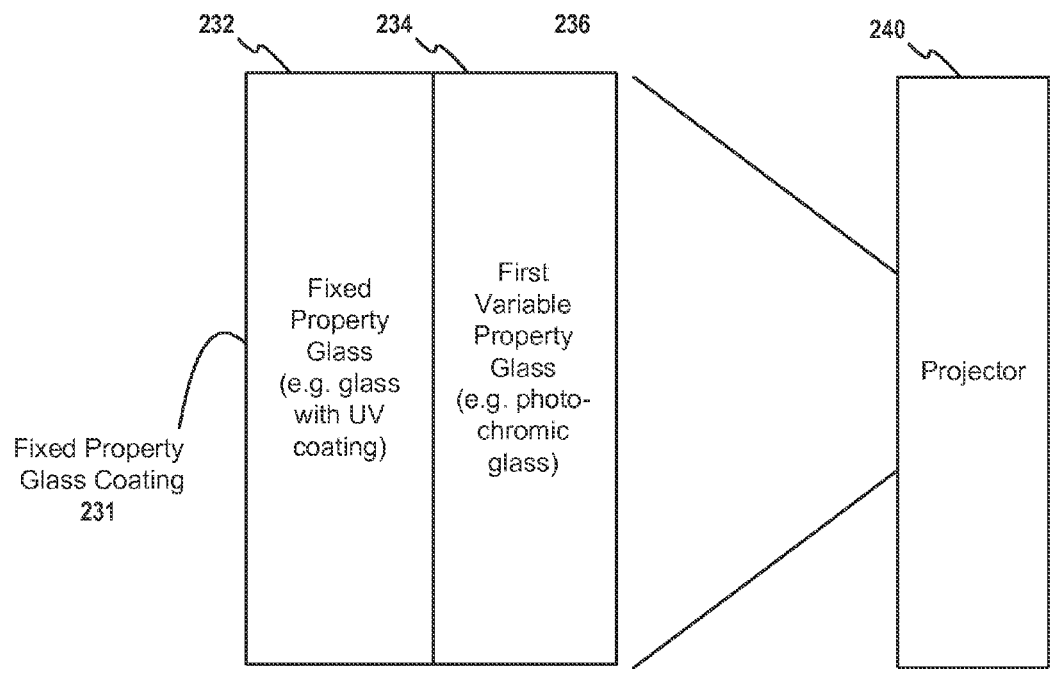
FIG. 8H depicts a projector, projecting onto an assembly of multiple layers of glass.

FIG. 8H depicts a projector, projecting onto an assembly of multiple layers of glass (as shown, two layers of glass), comprising a layer of fixed property glass 232 (e.g. UV glass), a layer of first variable property glass 234 (e.g. photo-chromic glass). The projector 240 might display any image using any combination of visible light and UV light. In fact, in one embodiment, the first variable property class can be white privacy glass (white and opaque), and the projected image is thus perceived by a human (viewing from the projector side) as if the projected image were projected on a projection screen. In other embodiments, the projector projects visible as well as UV wavelength light, and thus, can activate a layer of first variable property glass 234 (e.g. photo-chromic glass) in order to produce a pattern across the entire plane of photo-chromic glass. Photo-chromic glass is activated by incidence of UV light on a region of photo-chromic glass, thus any shape (e.g. any projected shape) may activate a region of the photo-chromic glass. In other embodiments involving projection, multiple projectors may be used, possibly using multiple projectors in an array, whereby the light from a particular projector is incident on only a portion of the assembly. In still other embodiments involving projection, multiple projectors may be used, possibly using multiple projectors arranged in space, and not necessarily within a plane, and whereby the projectors use different focal lengths and/or light sources.

Figure 8I:
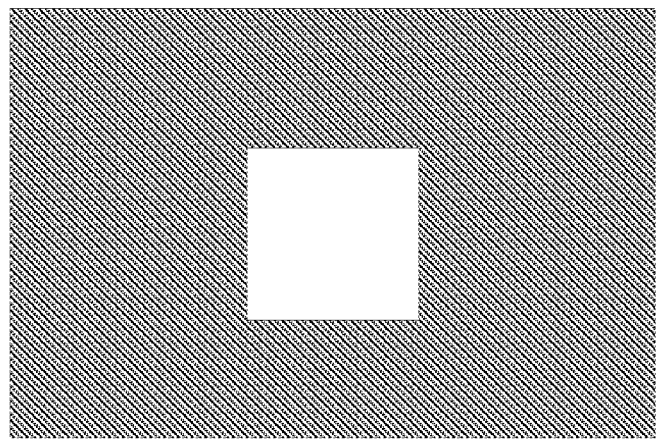
FIG. 8I depicts an image area formed by privacy glass activation in a central region within a border area.

FIG. 8I depicts an image area formed by privacy glass activation in a central region within a border area. As shown the shaded area represents a wall comprised of an array of panels, at least some of which are formed of privacy glass, the privacy glass activated by being responsive to applied voltages, and becoming opaque (e.g. white opaque). Thus many shapes formed by privacy glass panels (whether contiguous or non-contiguous) are possible by activation of certain selected panels forming the array of panels. Following the aforementioned embodiments involving one or more projectors, the image area formed by privacy glass activation in a central region within a border area may serve as a screen upon which any projected image may be cast.

Figure 8J:
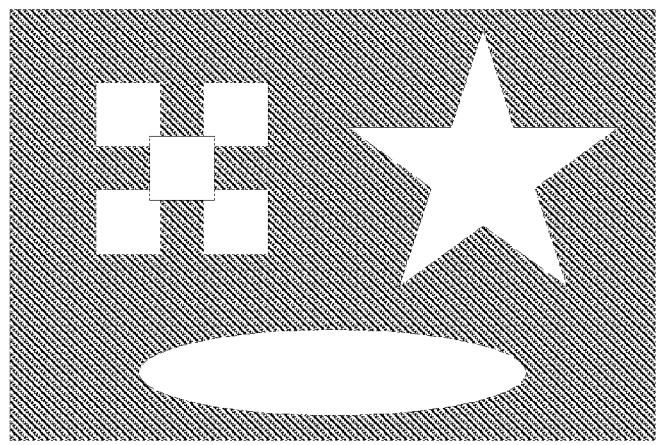
FIG. 8J depicts an image area formed by privacy glass regions within a border area.

FIG. 8J depicts an image area formed by privacy glass regions within a border area. The embodiment of FIG. 8I depicts contiguous areas formed by privacy glass panels, however other shapes (whether contiguous or non-contiguous) are possible by activating selected panels. As shown in FIG. 8J, other shapes are possible by activating selected panels to form the desired shape. By selectively activating panels, non-rectilinear shapes may be formed to the extent of the panel (i.e. pixel) resolution of the wall. As shown, pixels may be square or rectangular in shape, or may be triangular in shape, or can be formed of curved shapes, or any combination of shapes. As discussed herein, pixels comprising smart glass may be connected to other pixels, and a particular pixel need not be adjacent to another pixel.

Figure 8K:
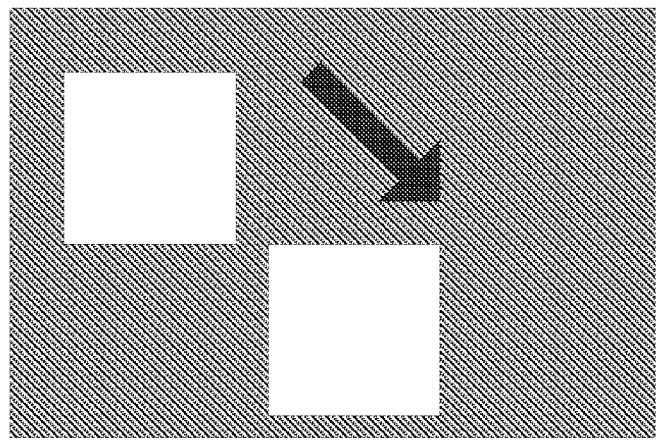
FIG. 8K depicts a moving activation in selected area formed by activation of selected privacy glass panels moving to various locations within a border area.

FIG. 8K depicts a moving activation in selected area formed by activation of selected privacy glass panels moving to various locations within a border area. Since any pixel can be activated (or deactivated) by an electronic control system 109, an image area formed by privacy glass regions can be moved to any location within the array of panels, and such movement can be synchronized in time. In a simple example, a large pixel might be moved in time to emulate movement of a "pong" ball and paddle. In a more sophisticated example, an animation of arbitrary complexity may be formed by activation and deactivation of selected privacy glass panels in an animation sequence.

Figure 9A:
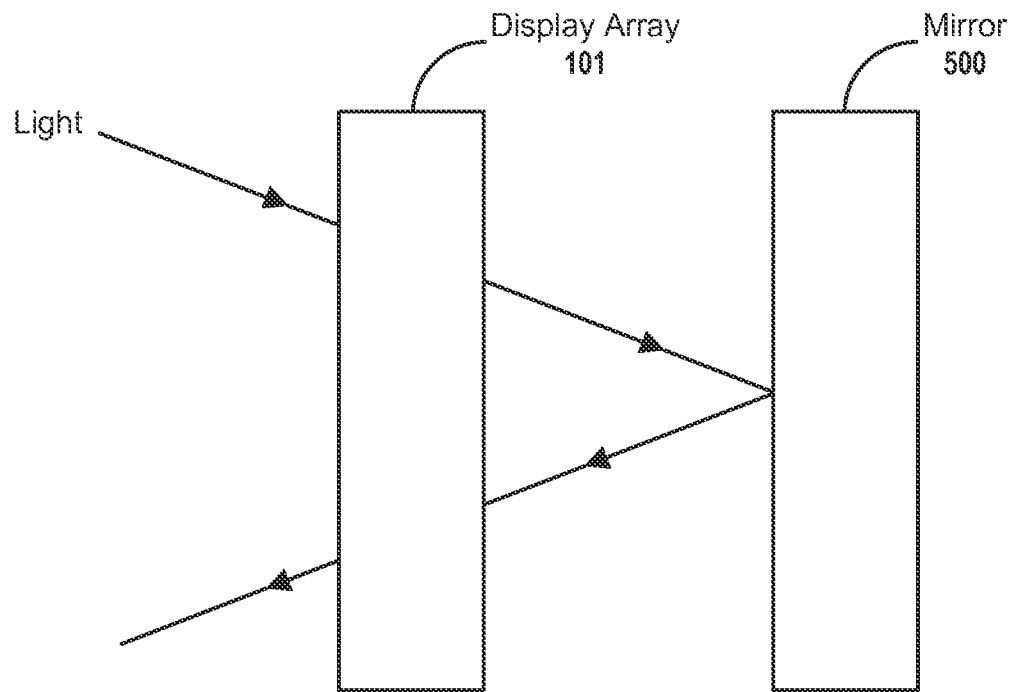
FIG. 9A illustrates an alternative application of the display array of FIGS. 5A-6 in which a mirror is placed behind the display array to reflect the image pattern on the display array, according to some embodiments.

FIG. 9A shows an embodiment in which a mirror is placed behind a display array (e.g. the display array 101) to reflect the image displayed on the array onto a distant surface (e.g. another building wall). In this case, a light source (e.g. the sunlight) is directed at the array and the mirror behind it. The array presents an image to be displayed. The mirror then reflects the light back via the array. At this time, the display array is like a checkerboard as some of its pixels are in the transparent state while others are in the opaque state to present the image. The reflected image, even on a building across the street, will be same size as the array it reflects from, if using sunlight and the mirror is flat and against the array. It is possible to scale these images up or down. For example, a grid of mirrors placed slightly behind the display array 101 can be used to scale up the imagery, rather than using one big flat mirror against the back of the array. There is one corresponding mirror in the grid for each smart glass pixel in display array 101, and these mirrors are placed slightly behind the corresponding smart glass panel. By slightly curving each mirror and giving them smaller spatial extents than the corresponding smart glass panels, as shown in FIG. 9A, the reflected imagery will be larger or smaller than the size of the original display array, depending on the direction of curvature of the mirrors. By not filling the entire extent of each grid position, the mirrors may prevent adjacent reflections from overlapping by the time they hit the distant wall. In some of embodiments, each mirror in the grid of mirrors may be independently movable by electronically controlled motors, so that the mirrors can, for example, track the motion of the sun as it moves during the day. When display array 101 is flat, the mirrors are typically moved all together so that they all have the same orientation at a given time; thereby causing the reflected image to remain coherent no matter what direction it is being reflected. The motion tracking may be used to cause the reflected image to always appear near the same location (e.g. a wall across the street) as the sun moves. Alternatively, the mirrors can be moved in synchrony to move the location at which the reflected image appears. For example, rapid mirror motion can cause the reflected image to rapidly move around an environment in the proximity of display array 101.

Figure 9B:
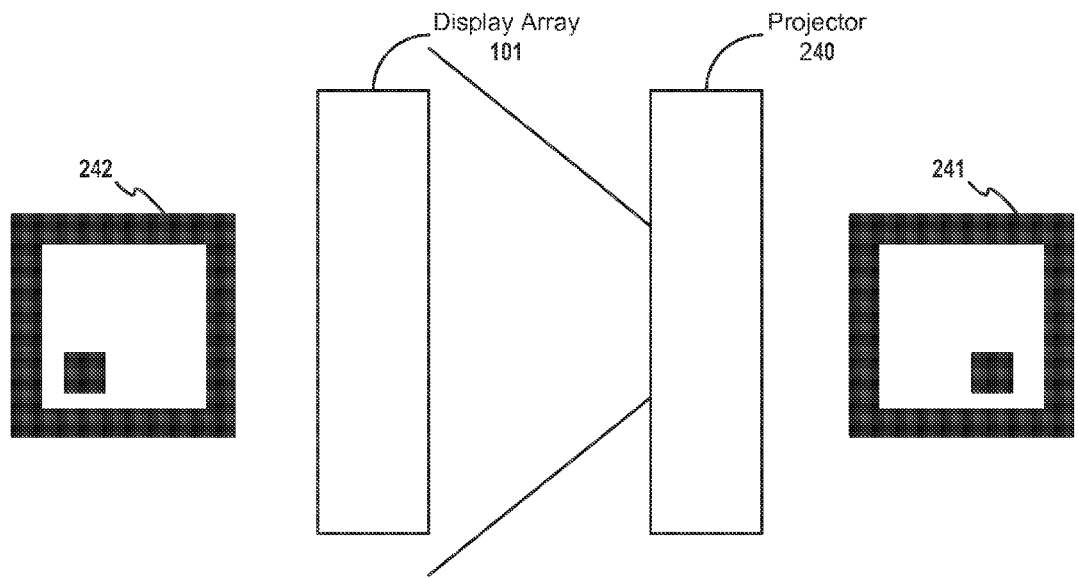
FIG. 9B shows an embodiment in which a projector is placed behind a display array to project an image through the array into free-space, according to some embodiments.

FIG. 9B shows an embodiment in which a projector is placed behind a display array (e.g. the display array 101) to project an image through the array into free-space. In this case, the system operates as a rear-projection system. In particular, a projected image can be translated to correct for the fact of a point of view looking into the projector on the other side of the screen, rather than a point of view looking at a screen from a point of view on the same side of the screen as the projector. More specifically, left and right coordinate may be translated, such that a reversed image 241 appears un-reversed in an un-reversed image 242 once projected onto the display array 101, and viewed from a point of view on the opposite side of the screen as the projector.

Figure 10A:
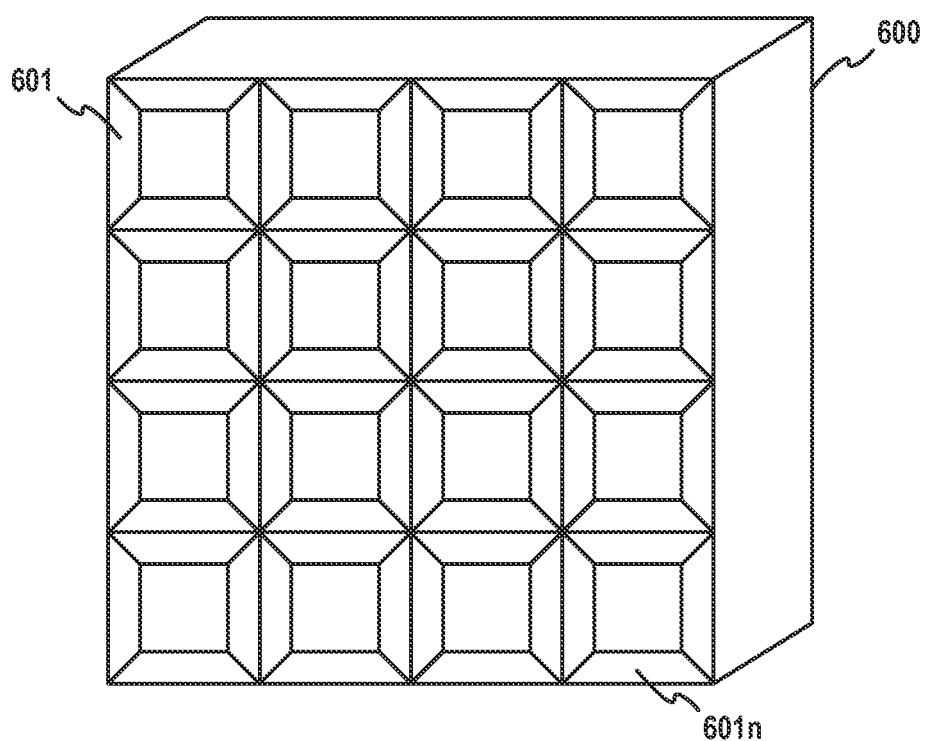
FIG. 10A shows an alternative implementation of the display array according to some embodiments.

FIG. 10A shows an alternative implementation of the display array 101. In FIG. 10A, a display panel (i.e. 600) includes a number of displaying units (or pixels) (i.e. 601-601n), each can be individually controlled electrically to vary properties, being responsive to an electrical signal (e.g. to become more transparent or more opaque). This is achieved by providing a number of dividers forming a grid on a first glass sheet of the display panel such that the smart glass layer (not shown in FIG. 10A) within each grid is insulated from other such layers or coatings on the first glass sheet of the display panel 600. A second sheet of glass (not shown) is applied, thus sandwiching the smart glass layer within each grid between the first and second glass sheets without physical connection to other such layers. This causes the display panel 600 to be a displaying array or grid.

Figure 10B:
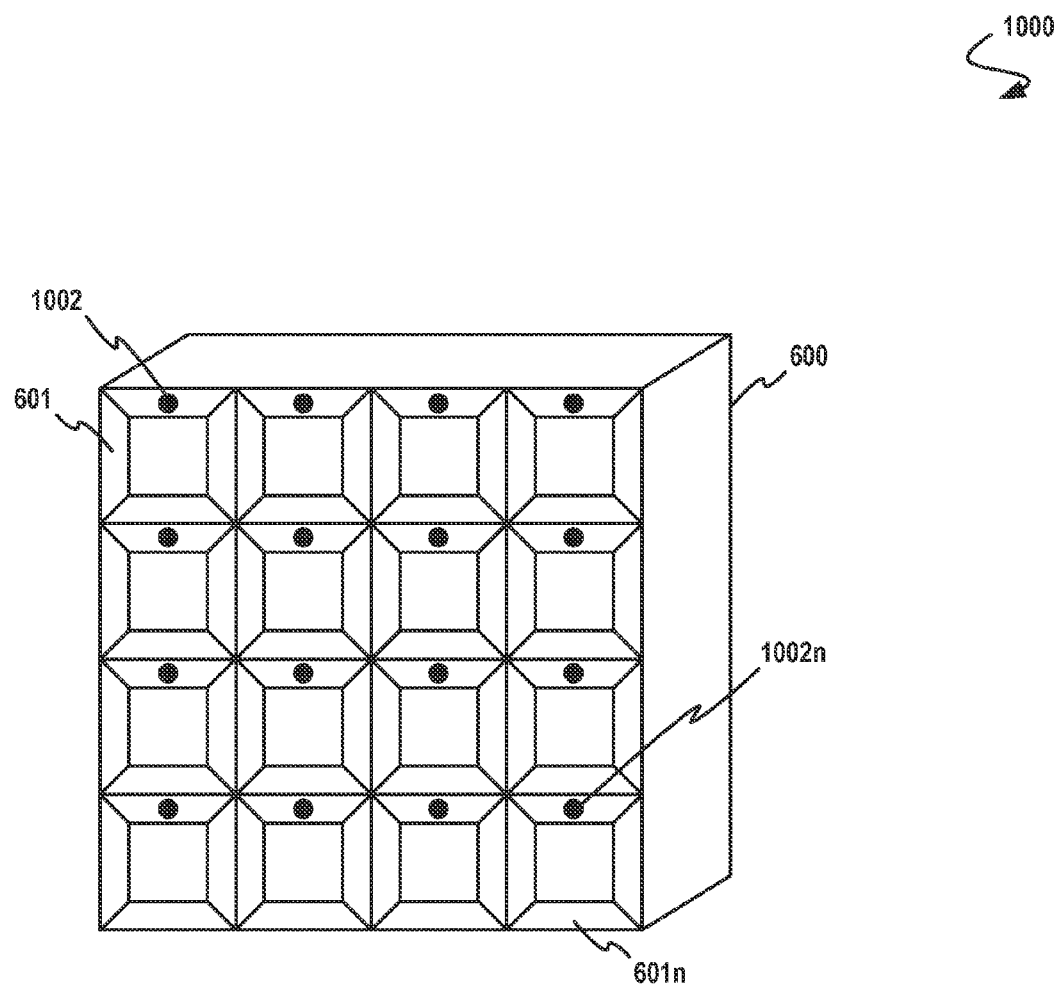
FIG. 10B shows an alternative implementation of the display array comprising a number of pixels, each pixel comprising a photocell, according to some embodiments.

FIG. 10B shows an alternative implementation of the display array 101. In FIG. 10B, a display panel (i.e. implementation 1000) includes a number of displaying units comprising grid elements, and/or pixels (i.e. 601-601n), each grid element comprising a photocell (i.e. 1001-1001n). Each photocell serves to measure incident light on the photocell, which in turn is a mechanism by which each corresponding pixel can be individually controlled by electrically varying properties (e.g. being responsive to a bit stream, and/or an electrical signal) to become more transparent or more opaque. For example, light incident on a photocell can be controlled by projecting an image over the entire region of a display panel, and the light portions of the projected image, wherever incident on a photocell activate the photocell, whereas the dark portions of the projected image, wherever incident on a photocell de-activate the photocell.

Figure 10C:
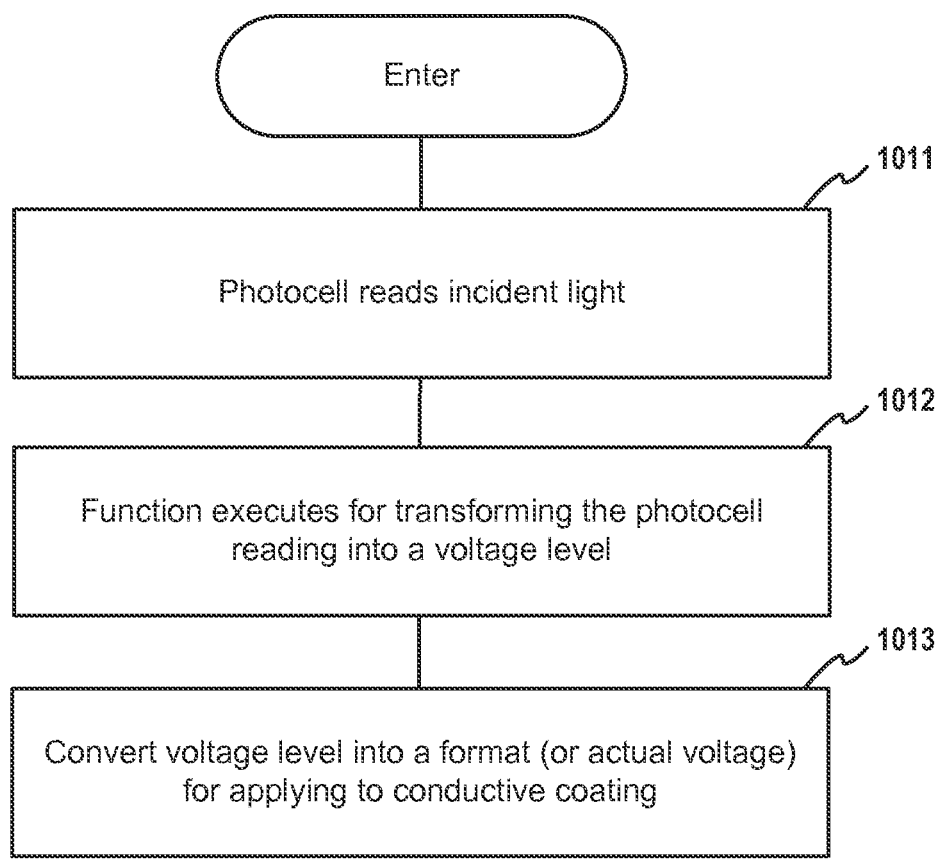
FIG. 10C is a depiction of a data flow within an implementation of a display unit having a photocell per pixel, according to some embodiments.

FIG. 10C is a depiction of a data flow within an implementation of a display unit having a photocell per pixel. FIG. 10C shows data flow for making a measurement of incident light from a photocell, transforming the photocell reading through a function into a calculated voltage, and applying the calculated voltage to one of the conductive coating layers of a pixel of the display unit. Now, returning to the discussion of FIG. 10A, and use of the electrically conductive coatings $204_0$ and $204_1$ that allow electric power in the form of electric voltage to be applied to the smart glass coating for a particular pixel, the embodiment of FIG. 10A. In particular, the device 209, as shown in FIG. 6 can comprise a photocell and circuitry to implement the data flow of FIG. 10C.

Controlling a pixel via a function involving a photocell input and a voltage output is merely one possible technique for individually controlling a given pixel. As shown and detailed in FIG. 5A, control logic 106 provides a signal (e.g. a voltage, a varying voltage, a digital signal, a digital bit stream, etc.) to display array 101. Possible and envisioned are many varied techniques for stimulating a particular pixel, based on delivering a bit stream to the display array 101. For example, those skilled in the art will recognize that an array of pixels could be daisy-chained (e.g. involving synchronous logic), so a bit stream produced by a control logic 106 can be received by a first pixel, and chained to a next pixel, and so on, such that any given pixel in the display array 101 can receive at least a portion of the bit stream. The daisy-chain may comprise the electrically conductive leads (e.g. a plus polarity lead 217, and a minus polarity lead 218). Such electrically conductive leads can be used to communicate between any first device 209 and any second device 209. In various embodiments, a first pixel in a daisy-chain may receive all bits in the bit stream, select a portion of the bit stream (e.g. a first one or more bits) and forward the remaining (i.e. unselected bits) through the daisy-chain logic to a next pixel, which in turn performs a similar selection and forwarding operation.

A daisy-chain can be connected into many topologies. For example, a daisy-chain can be comprised of a vertical (column-wise) daisy-chain as well as a horizontal (row-wise) daisy-chain, and the control logic 106 can transmit two bit streams, one bit stream in the row-wise direction, and another bit stream in the column-wise direction, Thus, any pixel may be addressed by a row and column address. As another example a daisy-chain can be formed from two or more non-contiguous display arrays. That is, two or more display arrays (possibly of differing organizations, or even differing composition) may be logically neighboring links in a daisy-chain, even though the two or more display arrays are not physically close (e.g. not physically adjacent, not physically abutting, not physically stacked, etc).

Now, considering the operation of the daisy-chain (in any topology) as coordinated by the coordinated by an electronic control system 109, a frame buffer contains a digital representation of an image to be displayed, where the representation contains a set of brightness or darkness values to be displayed at respective panels of the shading system 100. The brightness or darkness values (e.g. panel values 108) can consist of one value per panel so that grayscale images can be produced by the shading system 100. The panel values may also contain multiple values per panel, e.g. red, green, and blue values, so that color imagery can be displayed by the shading system 100. A panel value 108 may be stored in a frame buffer, and/or in a control logic, and/or in an LED array, and/or in any one or more panels. This section discusses embodiments for transmitting panel values from the electronic control system 109 (e.g. from the frame buffer) to the individual shading system 100 panels.

In one embodiment, the shading system 100 panels are arranged in a two-dimensional grid consisting of rows and columns. The panels within a column are considered ordered by their arrangement, either top to bottom or bottom to top. The electronic control system 109 possesses a direct connection to the panel ordered "first" in each column of the grid. All panels in a given column are connected to their immediate neighbors above or below them. The electronic control system 109 sends to each column a signal, optionally coded or compressed, the signal comprising a list of panel values to be displayed on the panels in the respective column. In the case that the list of values is ordered in the same way as the panels in the column, then the first panel reads the first value in the list and adjusts its brightness to a level corresponding to that first value, and the second panel reads the second value in the list and adjusts its brightness to a level corresponding to that second value, and so on. In an alternative embodiment, involving multiple layers, the first set of values corresponding to the multiple layers of the panel are read and displayed by the first panel. The first set of values are then removed from the list, and transmitted to the next panel in the column. This process is repeated until all panels in a column have read and displayed their respective display values, and transmitted the remainder along the column. In related embodiments, rows of the shading system 100 on a two-dimensional grid are substituted for columns in the above description.

In another embodiment, the columns of the shading system 100 are ordered first to last (e.g. from left to right) and the panels within each column are also ordered (e.g. from top to bottom). The first panel in each column is connected not only to the second panel in the column, but also to the first panels in the adjacent columns. The electronic control system 109 contains a connection to the first panel of the first column, and transmits a (possibly coded or compressed) signal representing all values to be displayed for all panels of the two-dimensional grid. The first panel receiving this signal decodes it to separate out the set of values to be displayed on the first column of panels, and transmits the remainder of the signal to the second column. The first panel of the first column then extracts the one or more values to be displayed on it, removes its corresponding one or more values from the list, and transmits the remainder of the values to the second panel of the column. Each panel of the column extracts its corresponding display values and transmits the remainder. Each first panel of a column extracts the set of values for that column and transmits the remainder to the first panel of the next column. In this way, panel values are distributed in "column-major" order to all panels of the shading system 100. In related embodiments, rows and columns are swapped in the above description, to create a "row major" method for distributing the panel values.

In another embodiment, the shading system 100 panels are may be arranged in any particular physical arrangement, though logically they can be arranged a first panel to a last panel in a pre-determined order. The electronic control system 109 is connected to the first panel in this ordering, and each panel is connected to the next panel in this ordering. For example, if the panels are arranged in a two-dimensional grid, the ordering may follow a "zig-zag" pattern proceeding left-to-right along the top row, then at the end of the first row dropping down to the last element of the second row and proceeding right-to-left to the start of the second row, dropping down to third row and proceeding left-to-right, and so on. The electronic control system 109 transmits to the first panel the list of desired panel values for the entire shading system 100, in the same juxtaposition that the panels are connected to each other. Each panel picks off the first one or more values to be displayed by itself, and sends the remainder of values to the next panel in the ordering.

In some embodiments a panel has an associated ID number, and the list of panel values transmitted from the electronic control system 109 to the panels can contain tuples of these ID numbers paired with the corresponding panel values to be displayed. In such embodiments, each panel searches the list of data it receives for the tuple containing the ID corresponding to itself, and extracts the panel values to be displayed from its tuple. The data stream is then transmitted by this panel to the next panel(s) to which it is connected. Each panel may store its ID in memory stored locally on the panel, so that this memory value can be compared with the data stream to identify the section containing the panel brightness value(s) to be displayed.

Returning to the discussions of FIG. 5A, the figure shows the functional block diagram of the integrated building display and shading system comprising a plurality of exterior building panels 154 of a building 156 arranged in an array (e.g. display array 101), each exterior building panel representing one pixel and the pixel resides in a first state (e.g. transparent state, translucent state, opaque state, colored state, privacy state, etc.) when a first excitation state (e.g. a voltage, an electric field, ultra-violet incidence) is applied to the exterior building panel and resides in a second state when a second excitation state is applied to the exterior building panel, thus allowing an image to be presented on the array. In some cases, an electronic control system including a frame buffer is used to control the panels to switch between the first state and the second state to display the image on the array (e.g. by producing an excitation). In other cases the existence, intensity, spectrum, and angle of incidence of ambient light (e.g. sunlight) controls the panels to switch between the first state and the second state to display the image on the array (e.g. said control actuated by producing an excitation).

Now, having an overall understanding of the aforementioned embodiments, and characteristics of each, various applications are now disclosed.

TABLE 2

| Configuration Characteristic | Exemplary Application(s) |
| --- | --- |
| White, opaque display region | Projection screen, reflection of unwanted sunlight and heat from sunlight |
| Rear-projection onto display assembly with photo-chromic layer | Determines which parts of the display are for a projection screen, and which parts are darkened. |

FIG. 11 is a flow chart for using an electronic control system for controlling an integrated building display and shading system. Referring to aspects shown in FIG. 5A and more specifically referring to FIG. 11, the process starts at block 1100. At 1101, the control logic 106 receives the frame data from the frame buffer 105. At 1102, the control logic 106 converts the frame data to the native driver signals to drive each pixel of the display array 101. The native driver signals may include the serial data strings, described above, for determining the opacity and color settings of each panel in display array 101. At 1103, the control logic 106 sends the native driver signals to the display array 101 and controls each pixel of the display array 101 to change its state (on/off/shade/R/G/B) in accordance with its driver signals. The process then ends at 1104.

Figure 12:
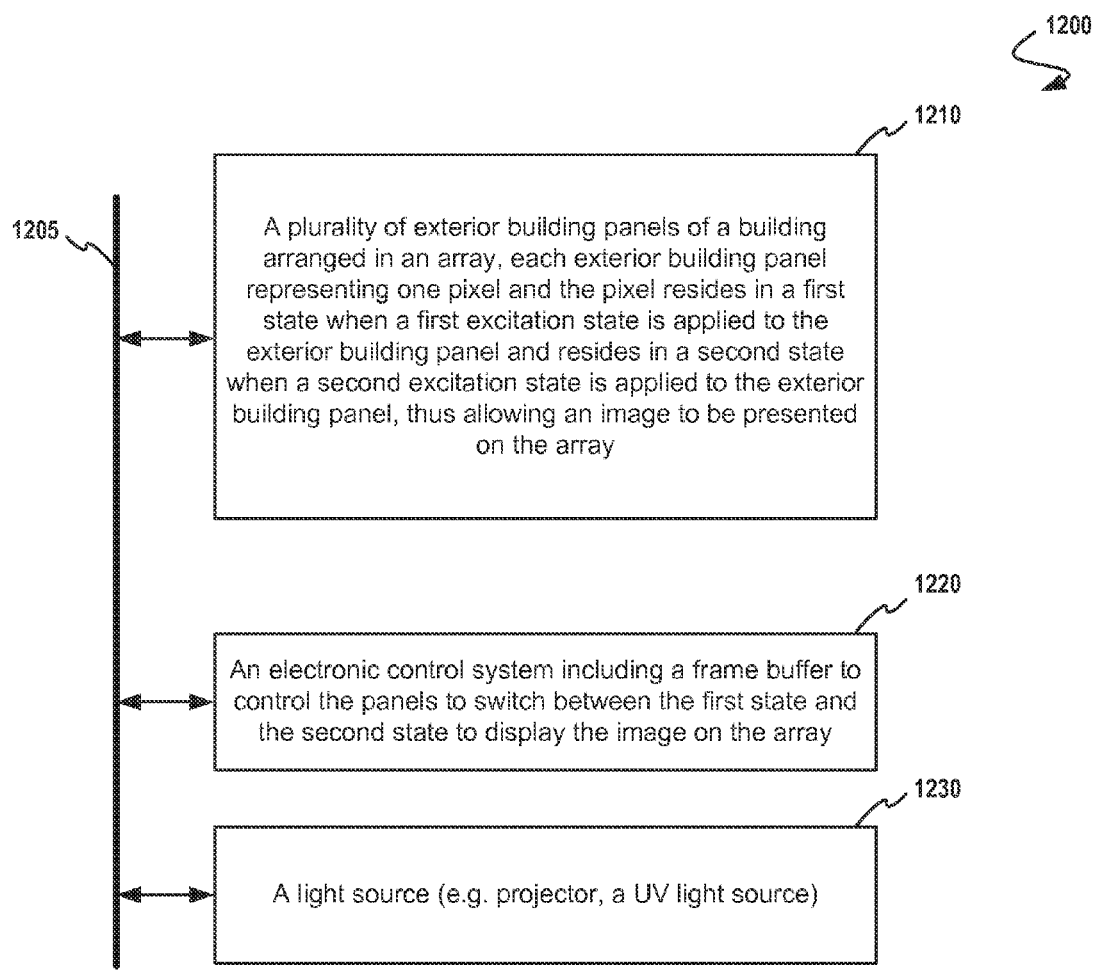
FIG. 12 depicts a block diagram of a system to perform certain functions of an integrated building display and shading system, according to some embodiments.

FIG. 12 depicts a block diagram of an electronic system to perform certain functions of an integrated building display and shading system. As an option, the present system 1200 may be implemented in the context of the architecture and functionality of the embodiments described herein. Of course, however, the system 1200 or any operation therein may be carried out in any desired environment. As shown, system 1200 comprises a plurality of modules, each module connected to a communication link 1205, and any module can communicate with other modules over communication link 1205. The modules of the system can, individually or in combination, perform method steps within system 1200. Any method steps performed within system 1200 may be performed in any order unless as may be specified in the claims. As shown, FIG. 12 implements an integrated building display and shading system as a system 1200, comprising modules, with at least one module having a processor and memory, and including a plurality of exterior building panels of a building arranged in an array, each exterior building panel representing one pixel and the pixel resides in a first state when a first excitation state is applied to the exterior building panel and resides in a second state when a second excitation state is applied to the exterior building panel, thus allowing an image to be presented on the array (see module 1210); and an electronic control system including a frame buffer to control the panels to switch between the first state and the second state to display the image on the array (see module 1220). The system 1200 also shows an optional light source, which light source may be controlled over communication link 1205 (see module 1230).

In the foregoing specification, the embodiments have been described with reference to specific exemplary embodiments thereof. It will, however, be evident that various modifications and changes may be made thereto without departing from the broader spirit and scope of the claims. The specification and drawings are, accordingly, to be regarded in an illustrative rather than restrictive sense.

What is claimed is:

1. An integrated building display and shading system, comprising:
   a plurality of exterior building panels of a building arranged in an array, each exterior building panel representing one pixel and the pixel resides in a first state when a first excitation state is applied to the exterior building panel and resides in a second state when a second excitation state is applied to the exterior building panel, thus allowing the array of panels to form an image when sun light is incident on the exterior building panels;
   one or more mirrors placed behind the array of panels to reflect the image back through the exterior building panels onto a distant surface;
   one or more electronically controlled motors, coupled to the one or more mirrors, that move the mirrors so as to track the motion of the sun; and
   an electronic control system including a frame buffer to control the panels to switch between the first state and the second state to form the image.

2. The integrated building display and shading system of claim 1, wherein:
   the first state comprises a transparent state and the second state comprises an opaque state.

3. The integrated building display and shading system of claim 1, wherein the one or more mirrors are curved mirrors capable of reflecting a scaled image.

4. The integrated building display and shading system of claim 1, wherein the one or more electronically controlled motors are capable of being moved independently.

5. The integrated building display and shading system of claim 1, wherein the one or more electronically controlled motors are capable of being moved in synchrony.

6. The integrated building display and shading system of claim 1, wherein at least one pixel is converted from either the first state or the second state to render the image a dynamic image.

7. The integrated building display and shading system of claim 6, wherein the at least one pixel is converted from either the first state or the second state at a speed to render the dynamic image as an animation.

8. A method comprising:
   receiving light on a plurality of exterior building panels of a building arranged in an array, each exterior building panel representing one pixel;
   applying a first excitation state to a pixel in the exterior building panel to place the pixel in a first state;
   applying a second excitation state to a pixel in the exterior building panel to place the pixel in a second state;
   forming an image on the array of panels when sun light is incident on the exterior building panels;
   reflecting, with one or more mirrors placed behind the array of panels, the image back through the exterior building panels onto a distant surface;
   moving the mirrors, by coupling one or more electronically controlled motors to the one or more mirrors, so as to track the motion of the sun; and
   switching, with an electronic control system including a frame buffer, between the first state and the second state to form the image.

9. The method as set forth in claim 8, wherein:
   the first state comprises a transparent state and the second state comprises an opaque state.

10. The method as set forth in claim 8, wherein the one or more mirrors are curved mirrors capable of reflecting a scaled image.

11. The method as set forth in claim 8, wherein the one or more electronically controlled motors are capable of being moved independently.

12. The method as set forth in claim 8, wherein the one or more electronically controlled motors are capable of being moved in synchrony.

13. The method as set forth in claim 8, further comprising rendering a dynamic image at least one pixel is converted from either the first state or the second state to render the image a dynamic image.

14. The method as set forth in claim 13, wherein the at least one pixel is converted from either the first state or the second state at a speed to render the dynamic image as an animation.

* * * * *